(12) United States Patent
Buyse et al.

(10) Patent No.: US 10,773,800 B2
(45) Date of Patent: Sep. 15, 2020

(54) VEHICLE-BASED DEPLOYMENT OF A TETHERED SURVEILLANCE DRONE

(71) Applicant: RSQ-Systems SPRL, Genval (BE)

(72) Inventors: Mathieu Buyse, Genval (BE); Jean Marc Coulon, Sant Julia de Loria (AD)

(73) Assignee: RSQ-Systems SPRL, Genval (BE)

( * ) Notice: Subject to any disclaimer, the term of this patent is extended or adjusted under 35 U.S.C. 154(b) by 0 days.

(21) Appl. No.: 16/431,324

(22) Filed: Jun. 4, 2019

(65) Prior Publication Data

US 2020/0231279 A1    Jul. 23, 2020

Related U.S. Application Data

(63) Continuation-in-part of application No. 16/046,721, filed on Jul. 26, 2018, now abandoned.

(51) Int. Cl.
*B64C 39/02* (2006.01)

(52) U.S. Cl.
CPC ............ *B64C 39/022* (2013.01); *B64C 39/02* (2013.01); *B64C 39/024* (2013.01)

(58) Field of Classification Search
CPC ................ B64C 39/022; B64C 39/024; B64C 2201/127; B64C 2201/208
See application file for complete search history.

(56) References Cited

U.S. PATENT DOCUMENTS

| 2,948,489 | A |   | 8/1960  | Miller, Jr. et al. |          |
|-----------|---|---|---------|--------------------|----------|
| 2,980,365 | A |   | 4/1961  | Yohe               |          |
| 3,148,847 | A |   | 9/1964  | Manificat          |          |
| 3,149,803 | A | * | 9/1964  | Petrides           | B64C 39/022 |
|           |   |   |         |                    | 244/17.13 |
| 3,223,359 | A |   | 12/1965 | Quick et al.       |          |
| 8,350,403 | B2 |  | 1/2013  | Carroll            |          |

(Continued)

FOREIGN PATENT DOCUMENTS

| CA | 3009980 A1 | * | 7/2017 | ........... B64C 39/022 |
| CA | 3018601 A1 | * | 9/2017 | ........... G05D 1/0866 |

(Continued)

OTHER PUBLICATIONS

International Search Report and Written Opinion for Application No. PCT/US2019/013681 dated May 1, 2019 (12 pages).

(Continued)

*Primary Examiner* — Christopher P Ellis
(74) *Attorney, Agent, or Firm* — Michael Best & Friedrich LLP

(57) ABSTRACT

An unmanned aerial vehicle subsystem includes a vehicle-mountable light bar. The light bar includes a periphery and a plurality of lights configured to illuminate through at least a portion of the periphery. The light bar further defines a volume within which is positioned an unmanned aerial vehicle pad and a tether extension and retraction mechanism. The subsystem further includes an unmanned aerial vehicle having at least one camera. A tether is operable with the tether extension and retraction mechanism and extendable from the tether extension and retraction mechanism to the unmanned aerial vehicle. The tether is configured to, during flight of the unmanned aerial vehicle, transmit power to the unmanned aerial vehicle and transmit data signals to and from the unmanned aerial vehicle.

8 Claims, 13 Drawing Sheets

(56) References Cited

U.S. PATENT DOCUMENTS

| | | | |
|---|---|---|---|
| 8,948,928 B2 * | 2/2015 | Alber | B64C 39/022 244/17.11 |
| 9,056,676 B1 * | 6/2015 | Wang | B64F 1/00 |
| 9,056,687 B2 | 6/2015 | Shachor et al. | |
| 9,139,310 B1 | 9/2015 | Wang | |
| 9,457,900 B1 | 10/2016 | Jones et al. | |
| 9,663,214 B2 | 5/2017 | Guetta et al. | |
| 9,671,787 B2 | 6/2017 | Foinet et al. | |
| 9,696,725 B2 | 7/2017 | Wang | |
| 9,789,947 B2 | 10/2017 | Glass et al. | |
| 9,826,256 B2 * | 11/2017 | Sham | G06Q 30/0265 |
| 9,952,022 B2 * | 4/2018 | Ueno | F41H 7/04 |
| 9,975,632 B2 | 5/2018 | Alegria | |
| 10,246,188 B2 | 4/2019 | Ichihara et al. | |
| 10,364,026 B1 | 7/2019 | Hanlon et al. | |
| 10,370,102 B2 * | 8/2019 | Boykin | B64C 39/024 |
| 10,507,914 B2 | 12/2019 | Walker et al. | |
| 2009/0005164 A1 | 1/2009 | Chang | |
| 2009/0294584 A1 * | 12/2009 | Lovell | B63B 27/10 244/110 F |
| 2009/0314883 A1 * | 12/2009 | Arlton | B64C 39/024 244/63 |
| 2010/0308174 A1 | 12/2010 | Calvrley | |
| 2011/0180667 A1 * | 7/2011 | O'Brien | B64C 39/022 244/135 R |
| 2011/0315810 A1 * | 12/2011 | Petrov | B64C 39/022 244/17.23 |
| 2012/0181380 A1 * | 7/2012 | Van Staagen | B64B 1/50 244/33 |
| 2013/0233964 A1 * | 9/2013 | Woodworth | B64D 17/80 244/2 |
| 2014/0183300 A1 * | 7/2014 | MacCulloch | B64C 39/024 244/1 TD |
| 2015/0142250 A1 * | 5/2015 | Cavender-Bares | A01C 7/00 701/23 |
| 2015/0153741 A1 | 6/2015 | North et al. | |
| 2015/0298806 A1 * | 10/2015 | Vander Lind | B63H 9/0685 518/704 |
| 2016/0200437 A1 * | 7/2016 | Ryan | B64C 39/022 244/99.2 |
| 2016/0318607 A1 | 11/2016 | Desai et al. | |
| 2017/0029105 A1 | 2/2017 | Ferren et al. | |
| 2017/0043872 A1 * | 2/2017 | Whitaker | B64D 1/18 |
| 2017/0126031 A1 | 5/2017 | Mo | |
| 2017/0161972 A1 * | 6/2017 | Moloney | G07C 5/0841 |
| 2017/0193308 A1 | 7/2017 | Buyse et al. | |
| 2017/0235018 A1 | 8/2017 | Foster et al. | |
| 2017/0259941 A1 | 9/2017 | Briggs, IV et al. | |
| 2017/0275025 A1 | 9/2017 | Johnson et al. | |
| 2018/0009549 A1 | 1/2018 | Sullivan et al. | |
| 2018/0050797 A1 * | 2/2018 | Palmer | B64C 39/022 |
| 2018/0050800 A1 | 2/2018 | Boykin et al. | |
| 2018/0118374 A1 * | 5/2018 | Lombardini | B60L 9/00 |
| 2018/0212413 A1 * | 7/2018 | Hundemer | H02G 11/02 |
| 2018/0251216 A1 | 9/2018 | Whitaker | |
| 2018/0312276 A1 | 11/2018 | Miller et al. | |
| 2019/0088156 A1 * | 3/2019 | Choi | G09B 9/08 |
| 2019/0106208 A1 * | 4/2019 | Sun | B64C 27/52 |
| 2019/0144114 A1 * | 5/2019 | Chen | B64C 39/024 |
| 2019/0161183 A1 | 5/2019 | Hagianu | |
| 2019/0220038 A1 | 7/2019 | Shih et al. | |
| 2019/0295033 A1 | 9/2019 | Longin et al. | |

FOREIGN PATENT DOCUMENTS

| | | | |
|---|---|---|---|
| CA | 3018601 A1 | 9/2017 | |
| DE | 102005014949 A1 | 10/2006 | |
| EP | 3287358 A1 | 2/2018 | |
| FR | 3037448 A1 | 12/2016 | |
| JP | 2017-218061 A1 | 12/2017 | |
| WO | 2007/141795 A1 | 12/2007 | |
| WO | WO-2007141795 A1 * | 12/2007 | B64C 39/022 |
| WO | 2016/200021 A1 | 12/2016 | |
| WO | 2017/029611 A1 | 2/2017 | |
| WO | 2017/147188 A1 | 8/2017 | |
| WO | WO-2017147188 A1 * | 8/2017 | B64F 3/02 |
| WO | 2018/100564 A1 | 6/2018 | |

OTHER PUBLICATIONS

International Search Report and Written Opinion for Application No. PCT/IB2019/000877 dated Dec. 13, 2019 (14 pages).

International Search Report and Written Opinion for Application No. PCT/IB2019/000889 dated Dec. 5, 2019 (13 pages).

International Search Report and Written Opinion for Application No. PCT/US2019/020573 dated Jun. 19, 2019 (15 pages).

* cited by examiner

VEHICLE-BASED DEPLOYMENT OF A TETHERED SURVEILLANCE DRONE

CROSS-REFERENCE TO RELATED APPLICATIONS

This application is a continuation-in-part of co-pending U.S. patent application Ser. No. 16/046,721, filed Jul. 26, 2018, the entire content of which is incorporated herein by reference.

FIELD

The present disclosure relates to unmanned aerial systems for first responders and other public safety personnel.

SUMMARY

In one embodiment, the disclosure provides an unmanned aerial system including a base station, an unmanned aerial vehicle ("UAV") and a tether extending between the base station and the UAV. The base station includes a base housing coupled to a vehicle, a power source, a controller, and a first coupling mechanism coupled to the base housing. The UAV includes a UAV housing, a propulsion system coupled to the UAV housing, a second coupling mechanism, and at least one camera coupled to the UAV housing. The tether extends between the first coupling mechanism and the second coupling mechanism, and is configured to transmit power to the UAV, as well as transmit data signals between the base station controller and the UAV.

In some embodiments, the tether is configured for retractable storage within the base housing. In some embodiments, the first coupling mechanism further comprises one or more of a spool, a motor, a tensioning device, and a friction brake. In some embodiments, the UAV includes a plurality of cameras. In some embodiments, the plurality of cameras is disposed circumferentially about a bottom side of the UAV housing. In some embodiments, the unmanned aerial system further includes a sensor configured to detect a relative orientation between the base station and the UAV, which may be disposed on the UAV, the base station, or various combinations thereof. In some embodiments, the base station controller is further configured to control the propulsion system and the camera of the UAV based, at least in part, on the relative orientation of the base station and the UAV. In some embodiments, the base station controller is configured to store image data from the camera in a memory of the controller, and configured to automatically transmit a portion of the image data via a transceiver in response to detecting a predetermined wireless signal from a secure synchronization point.

In some embodiments, the UAV further includes one or more LEDs configured to indicate one or more states of the unmanned aerial system. In some embodiments, the base station power source is electrically coupled to an electrical system of the vehicle. In some embodiments, the power source of the base station includes a battery retained within the base housing. In some embodiments, the unmanned aerial system further includes a tracking device in wireless communication with the base station controller. In some embodiments, the base station controller is configured to control the propulsion system and the camera of the UAV based, at least in part, on the location of the tracking device. In some embodiments, the base housing is configured to securely retain or enclose the UAV housing.

In some embodiments, the disclosure provides a surveillance system that includes a vehicle mounted surveillance platform and a remote sensor platform. The vehicle mounted surveillance platform includes a base housing coupled to a vehicle, a controller, and a retractable tether configured to transmit and receive data signals. The remote sensor platform includes a UAV housing, a propulsion system, and a sensor array. The UAV housing is configured to couple to an end of the retractable tether. The propulsion system is configured to receive electrical power and data signals from the controller via the retractable tether and provide sustained flight of the remote sensor platform. The sensor array is coupled to the UAV housing and includes at least one camera configured to transmit image data to the controller via the retractable tether.

In some embodiments, the surveillance platform further includes a tensioning device coupled to the retractable tether. In some embodiments, the controller is configured to actuate the tensioning device. In some embodiments, the sensor array includes a plurality of cameras disposed circumferentially about a bottom side of the UAV housing. In some embodiments, the end of the retractable tether is axially aligned with a center of mass of the remote sensor platform. In some embodiments, the sensor array further includes one or more of an ultrasonic sensor, a Lidar sensor, a temperature sensor, an airspeed sensor, a barometric sensor, and an orientation sensor. In some embodiments an infrared sensor or camera may also be used. In yet other embodiments, facial recognition technology can be used. In some embodiments, the controller is configured to control the propulsion system based, at least in part, on data signals received from the sensor array.

In some embodiments, the controller is configured to store sensor data from the sensor array in a memory of the controller. In some embodiments, the controller is configured to automatically transmit a portion of the sensor data via a transceiver in response to detecting a predetermined wireless signal from a secure synchronization point. In some embodiments, the remote sensor platform further includes one or more LEDs configured to indicate one or more state of the unmanned aerial system. In some embodiments, the controller is electrically coupled to an electrical system of the vehicle. In some embodiments, the controller is configured to control the propulsion system based, at least in part, on an operating state of the vehicle. In some embodiments, the surveillance system includes a tracking device. In some embodiments, the controller is configured to control the propulsion system and the at least one camera based, at least in part, on a detected location of the tracking device.

In some embodiments, the disclosure provides an unmanned aerial system that includes a UAV and a base station. The UAV includes an electrical interface, a propulsion system coupled to the electrical interface, and a sensor array coupled to the electrical interface. The sensor array includes at least one camera and an orientation sensor. The base station includes a base housing coupled to a vehicle, an extensible tether coupled to the electrical interface, and a controller coupled to the propulsion system and the sensor array via the extensible tether. The controller includes a power source, at least one processor, a transceiver, and a non-transitory, computer-readable memory storing program instructions. The program instructions are configured to be executed by the at least one processor to implement flight control, sensor control, storage of sensor data, and transmission of sensor data.

In another embodiment, an unmanned aerial vehicle subsystem includes a vehicle-mountable light bar. The light bar includes a periphery and a plurality of lights configured to illuminate through at least a portion of the periphery. The light bar further defines a volume within which is positioned an unmanned aerial vehicle pad and a tether extension and retraction mechanism. The subsystem further includes an unmanned aerial vehicle having at least one camera. A tether is operable with the tether extension and retraction mechanism and extendable from the tether extension and retraction mechanism to the unmanned aerial vehicle. The tether is configured to, during flight of the unmanned aerial vehicle, transmit power to the unmanned aerial vehicle and transmit data signals to and from the unmanned aerial vehicle.

In another embodiment, a first responder vehicle includes a vehicle body, a portion of which defines a vehicle roof, and a vehicle mounted surveillance platform. The platform includes a base station defining a volume within which is positioned an unmanned aerial vehicle pad and a tether extension and retraction mechanism. The platform also includes a light bar having a plurality of lights in operable communication with a controller of the vehicle. An unmanned aerial vehicle is configured for tethered deployment from and transportation within the base station. The unmanned aerial vehicle is configured to be deployed from an operator positioned within the vehicle body.

In another embodiment, an unmanned aerial vehicle subsystem includes a base station defining a volume within which is positioned an unmanned aerial vehicle pad and a tether extension and retraction mechanism. The subsystem also includes a vehicle-mountable light bar.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways.

Figure 1:
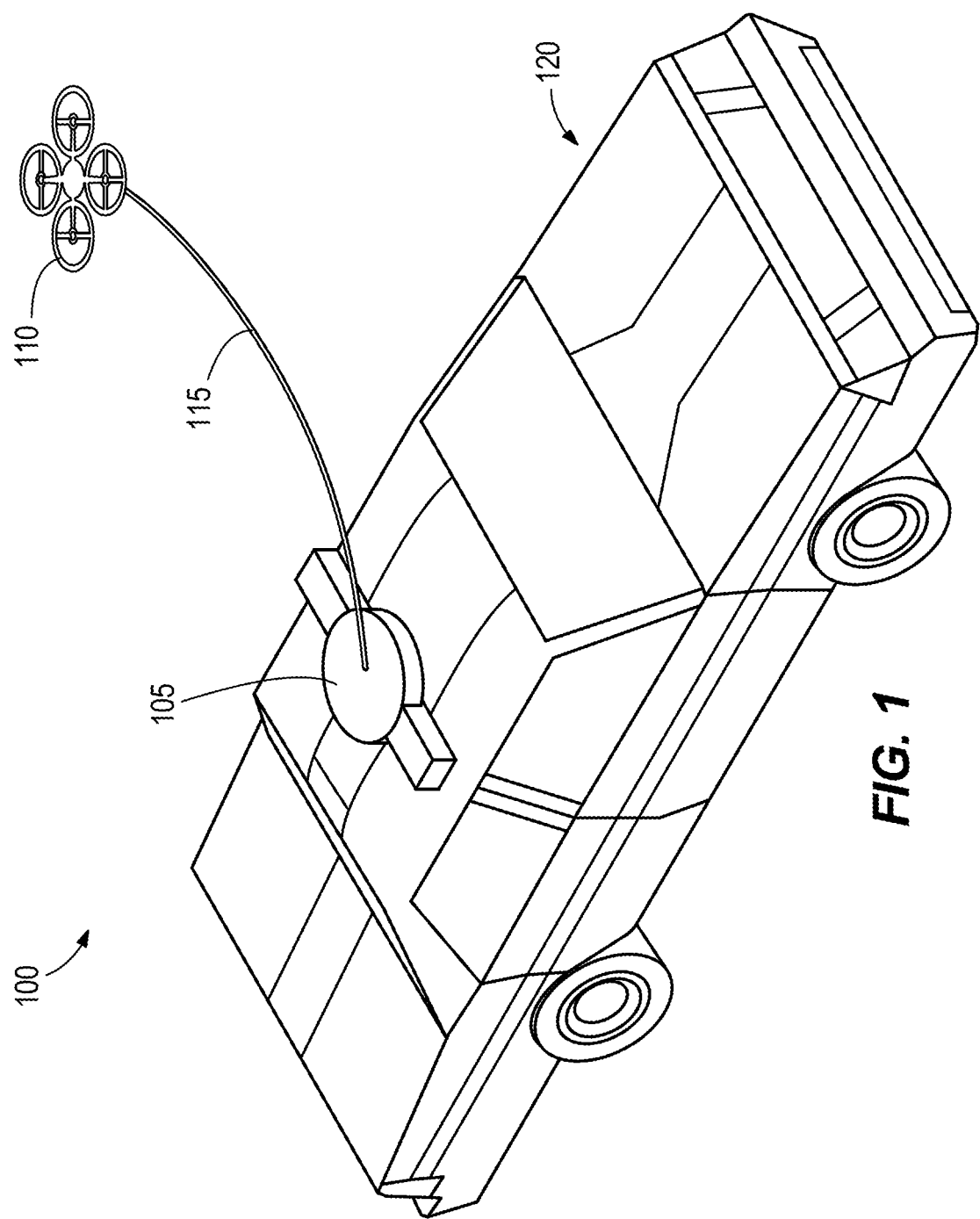
FIG. 1 illustrates one embodiment of an unmanned aerial system.

FIG. 1 illustrates an unmanned aerial system 100, according to some embodiments. The unmanned aerial system 100 includes a base station 105, an unmanned aerial vehicle ("UAV") 110, and a tether 115 extending between the base station 105 and the UAV 110. The base station 105 is mounted on a vehicle 120, and may be integrated into a light-bar, as shown. In the illustrated embodiment, the vehicle 120 is a patrol car, but may be any other vehicle, such as an ambulance, fire engine, motorcycle, watercraft, or other emergency vehicle. The UAV includes a propulsion system to keep the UAV 110 aloft, as well as one or more cameras and sensors. The tether 115 is configured to secure the UAV 110 to the base station 105, as well as communicate power from the base station 105 to the UAV 110, such as for the propulsion system. The tether 115 is also configured to transmit data signals between the base station 105 and the UAV 110, such as for the base station 105 to control the propulsion system or a camera, or receive data from the cameras or sensors. Accordingly, deployment, flight, and recovery of the UAV 110 may be controlled by the base station 105. For example, the base station 105 may deploy the UAV 110 to monitor an area around the vehicle 120, such as with the camera or sensors. Alternatively, the UAV 110 may maintain autonomous control of itself, while receiving power from the base station 105. In some embodiments, flight control and/or sensor control is handled collaboratively by the base station 105 and the UAV 110. When not in flight, the UAV 110 is configured for docking with the base station 105. The base station 105 includes housing and a cover system that retain the UAV 110 when the UAV 110 is docked with the base station 105. For example, the housing may include a lid that protects the UAV 110 from tampering or inclement weather.

Figure 2:
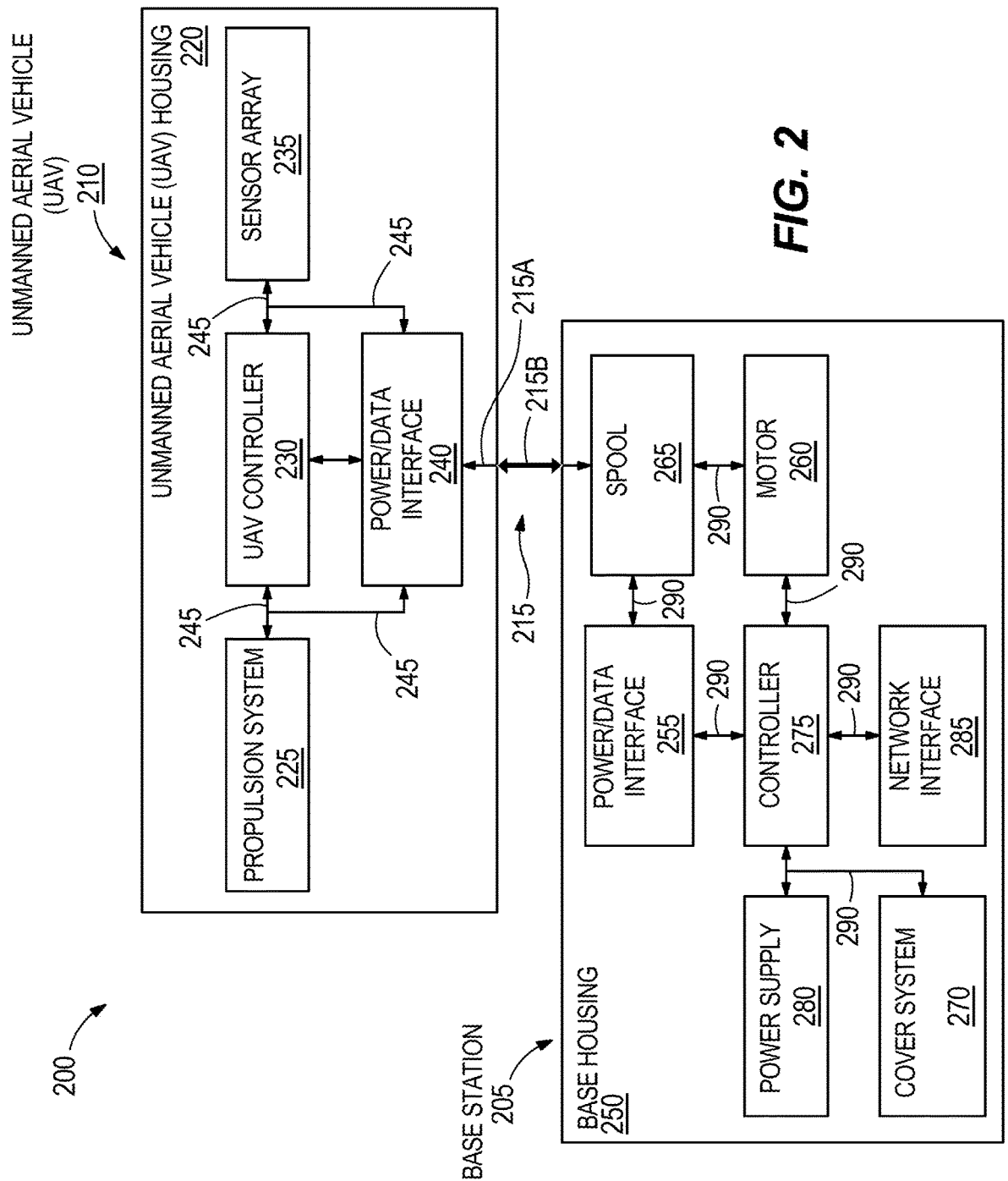
FIG. 2 is a block diagram of an unmanned aerial system, according to some embodiments.

FIG. 2 illustrates a block diagram of an unmanned aerial system 200, according to some embodiments. The unmanned aerial system 200 includes a base station 205, a UAV 210, and a tether 215 between the UAV 210 and the base station 205. The UAV 210 includes a UAV housing 220, such as a lightweight aluminum, fiberglass, polymer, or carbon-fiber shell. The UAV 210 further includes a propulsion system 225, a UAV controller 230, a sensor array 235, and a power/data interface 240 coupled to the UAV housing 220. The propulsion system 225, UAV controller 230, and sensor array 235 are electronically coupled to the power/data interface 240 via electronic links 245. The controller is electronically coupled to the propulsion system 225 and the sensor array 235 via electronic links 245. Accordingly, power and/or data may be supplied directly to one or more of the propulsion system 225, the sensor array 235, and the controller directly from the power/data interface 240, or may be mediated by the UAV controller 230. For example, Power-over-Ethernet ("POE") may be received at the power/data interface 240 and supplied to the UAV controller 230. In some embodiments, the UAV controller 230, which may include various electronic memories, processors, embedded circuitry, and the like, receives the POE, separates the supplied power and the communicated data, adapts the supplied power based on a required voltage or current of the propulsion system 225 and the sensor array 235, and provides the power and data to the propulsion system 225 and the sensor array 235.

In some embodiments, the UAV controller 230 receives sensor data from one or more sensors of the sensor array 235 and communicates the sensor data to the power/data interface 240. In other embodiments, the sensor array 235 communicates sensor data from one or more sensors to the power/data interface 240 directly. In other embodiments, sensor data from a first plurality of sensors may be transmitted from the sensor array 235 to the UAV controller 230 and sensor data from a second plurality of sensors is transmitted from the sensor array 235 to the power/data interface 240. For example, in the case that the sensor array 235 includes an accelerometer and one or more cameras, the accelerometer data may be communicated to the UAV controller 230, while the image data from the one or more cameras is communicated to the power/data interface 240. By way of further example, image data may be communicated to both the UAV controller 230 and the power/data interface 240. Accordingly, computational requirements of the system may be distributed or scaled between the UAV controller 230 and other controllers of the system 200 as desired.

In some embodiments, the sensor array 235 includes a plurality of cameras disposed circumferentially about a bottom side of the UAV housing 220. In some embodiments, the sensor array 235 includes cameras variously configured for different ambient light conditions, distances, resolutions, framerates, fields of view, etc. In some embodiments, the sensor array 235 further includes at least one sensor configured for detecting a relative orientation between the UAV 210 and the base station 205. In some embodiments, the relative orientation may be sensed with one or more magnetometers, accelerometers, GPS sensors, and the like. In other embodiments, the relative orientation may be sensed with the one or more cameras. For example, various image and video analysis techniques, such as parallax calculations, may be applied to image data from a plurality of cameras to sense or determine a relative orientation between the UAV 210 and the base station 205. Further, in some embodiments, one or more of the cameras may be controlled based on the relative orientation of the UAV 210 or between the UAV 210 and the base station 205. In some embodiments, four cameras are positioned about the UAV housing to provide 360-degree viewing and data over four different channels, such that data can be provided for evidentiary collection purposes. In other embodiments, fewer or more than four cameras can be set up for this purpose.

The propulsion system 225 includes one or more thrust-generating devices, such as various propellers, fans, jets, rockets, thrusters, and the like. The propulsion system 225 receives power and control signals from the power/data interface 240, the UAV controller 230, or a combination thereof to control thrust vectoring of respective thrust-generating devices. Accordingly, the propulsion system 225 is thus configured to provide sustained or indefinite flight for the UAV 210, for example, static or dynamic flight as desired. In some embodiments, the propulsion system 225 is controlled based on a relative orientation between the UAV 210 and the base station 205. For example, the propulsion system 225 may be controlled to maintain a static position of the UAV 210 relative to the base station 205 or follow one or more paths relative to the base station 205.

In addition to the electronic links 245, the power/data interface 240 is also communicably coupled to the base station 205 via the tether 215. In the illustrated embodiment, the tether 215 includes a wired connection 215A configured to transmit POE between the base station 205 and the UAV 210. In some embodiments, the tether 215 may include discrete wired power and data connections. In some embodiments, the tether 215 includes a protective sheath 215B. In some embodiments, the tether 215 is sheathed with a thermoplastic sheath, such as polyvinyl chloride (PVC). Alternatively, or in addition, the protective sheath 215B flexibly and mechanically couples the UAV housing 220 to the base station housing. Accordingly, various stresses on the tether 215 are distributed by the protective sheath 215B rather than passed on to the wired connection 215A. In some embodiments, the tether 215 is connected directly to a base station housing 250. In other embodiments, the tether 215 is coupled to a spool 265, which is coupled to the base station housing 250.

The base station housing 250 is configured for mounting to a vehicle (e.g. vehicle 120 of FIG. 1), and is made of a resilient material, such as an aluminum, fiberglass, polymer, or carbon-fiber shell. The base station housing 250 further includes a power/data interface 255, a motor 260 coupled to the spool 265, a cover system 270, and a base station controller 275 coupled to the power/data interface 255 and the motor 260. The base station controller 275 is further coupled to a power supply 280, a network interface 285, and the cover system 270. The power/data interface 255 is substantially similar to the power/data interface 240 of the UAV 210, and is coupled to the wired connection 215A of the tether 215. In the illustrated embodiment, the power/data interface 255 is coupled to the wired connection 215A at the spool 265. Accordingly, power and data (e.g. POE) may be communicated between the power/data interface 255 of the base station 205 to the power/data interface 240 of the UAV 210 via the tether 215. The spool 265 is further coupled to the motor 260 and thereby configured for adjustment of the tether 215. Accordingly, the tether 215 may be extended or retracted as desired. Additionally, the motor 260 and spool 265 may be configured for applying a force to the protective sheath 215B of the tether 215. For example, the motor 260 and spool 265 may be configured for electronic braking in high winds, or to reel in a damaged UAV 210. Accordingly, deployment, flight, and recovery of the UAV 210 are improved. Although a spool 265, motor 260, and electronic braking have been described and illustrated, any suitable tensioning or tether adjustment mechanisms may be used as desired.

The base station controller 275 is coupled to the various components of the base station 205 via electronic links 290. The controller receives electrical power from the power supply 280. In the illustrated embodiment, the power supply 280 is coupled to an electrical system of the vehicle to which the base station 205 is mounted, as well as to adapt power received from the vehicle based on the voltage/current requirements of one or more components of the base station 205 and/or the UAV 210. In some embodiments, the power supply 280 further includes one or more energy storage devices, such as lithium-ion batteries.

The cover system 270 receives power from the power supply 280 and is configured to open and close a cover of the housing, such as a lid or segmented door. When the UAV 210 is docked with the base station 205, the cover is configured to enclose the base station 205, the tether 215, and the UAV 210. When the UAV 210 is in an aerial configuration, the cover is configured to minimize interference with movement of the UAV 210 or tether 215. In some embodiments, the cover system 270 includes one or more motors, elastic members, latches, or other devices configured for opening the cover, closing the cover, or maintaining the cover in an open or closed position. Actuation of the cover system 270 is controlled by the base station controller 275. Accordingly, the UAV 210 is securely retained within the base station housing 250, for example, while the vehicle is in motion.

The base station controller 275 includes various electronic processors and memories storing program instructions executable by the processors to execute functionality described herein. The base station controller 275 is further coupled to the network interface 285. The network interface 285 is configured for wired and wireless electronic communication. For example, the network interface 285 may include one or more antennas and may be configured to communicate over one or more wireless networks using protocols such as Wi-Fi, Bluetooth, WLAN, CDMA, etc. In some embodiments, the network interface 285 is communicatively coupled with an external data source. For example, the network interface 285 may be coupled with a mobile data terminal ("MDT") in the vehicle over a wired connection, or may be coupled to a remote server over a mobile broadband network. In some embodiments, the network interface 285 connects to server via virtual private network ("VPN") client that complies with one or more cryptographic standards related to maintaining continuity of evidence. For example, the VPN client may comply with Federal Information Processing Standard ("FIPS") Publication 140-2, (FIPS PUB 140-2). Accordingly, the base station controller 275 may securely communicate with both the UAV 210 and external data sources with the tether 215 and the network interface 285, respectively.

The base station controller 275 is configured to control the UAV 210, for example, in conjunction with the UAV controller 230, or independently. For example, the base station controller 275 may be configured to control one of the propulsion system 225 and the sensor array 235 while the UAV controller 230 controls the other of the propulsion system 225 and the sensor array 235. The base station controller 275 is configured to receive sensor data from the sensor array 235. In some embodiments, the base station controller 275 is configured to transmit sensor data to an external data source in real-time. In some embodiments, the base station controller 275 is configured to store sensor data in one or more electronic memories of the base station controller 275. In further embodiments, the base station controller 275 is configured to transmit a first portion of sensor data in real-time while simultaneously storing a second portion in the one more electronic memories of the base station controller 275. Accordingly, the base station controller 275 may be configured for record redundancy (e.g. when the first portion and the second portion comprise substantially similar sensor data) or reduced bandwidth requirements (e.g. when the first portion of sensor data is smaller than the second portion of sensor data).

The base station controller 275 is further configured to receive data from an external data source. In some embodiments, the base station controller 275 is configured to control the UAV 210 based, at least in part, on data from an external data source. For example, the base station controller 275 may transition the UAV 210 from a docked configuration to an aerial configuration in response to receiving an event notification signal, such as an operating state of the vehicle or a request from an electronic device, such as a button within the vehicle or on the base station, or a portable electronic device associated with a user of the vehicle. For example, in some embodiments, the UAV 210 is transitioned from a docked configuration to an aerial configuration in response to receiving an event notification signal indicative that a weapon is in proximity to the UAV 210, such as a handgun of the user associated with the anchor vehicle having been withdrawn from a smart holster. Further, in some embodiments, the location and/or flight pattern of the UAV 210 may be controlled from an electronic device, such as a joystick or touchscreen within the anchor vehicle, or the portable electronic device associated with the user of the anchor vehicle.

The operating state may include any various operating states of the vehicle, such as an operating state of the drivetrain (e.g. Park, Neutral, Drive, etc.), an operating state of the electrical system (e.g. Off, Accessory, or Drive), or any other operating state of the vehicle. For example, the base station controller 275 may be configured to transition the UAV 210 between a docked configuration and an aerial configuration in response to the vehicle operating state being changed from "Drive" to "Park." By way of additional example, the base station controller 275 may be configured to transition the UAV 210 between an aerial configuration in response to the vehicle operating state being changed from "Accessory" to "Off." Further, an operating state of the vehicle may include activation or deactivation of various steering and traction assistance systems, such as in response to aggressive braking, turning, or loss of traction. For example, the operating state may include a sudden stop or detection of an accident involving the anchor vehicle.

In some embodiments, the base station controller 275 is configured to control the UAV 210 based, at least in part, on sensor data received from the sensor array 235. For example, the base station controller 275 may transition the UAV 210 from an aerial configuration to a docked configuration based on data indicative of unfavorable environmental conditions from one or more sensors of the sensor array 235.

Figure 3:
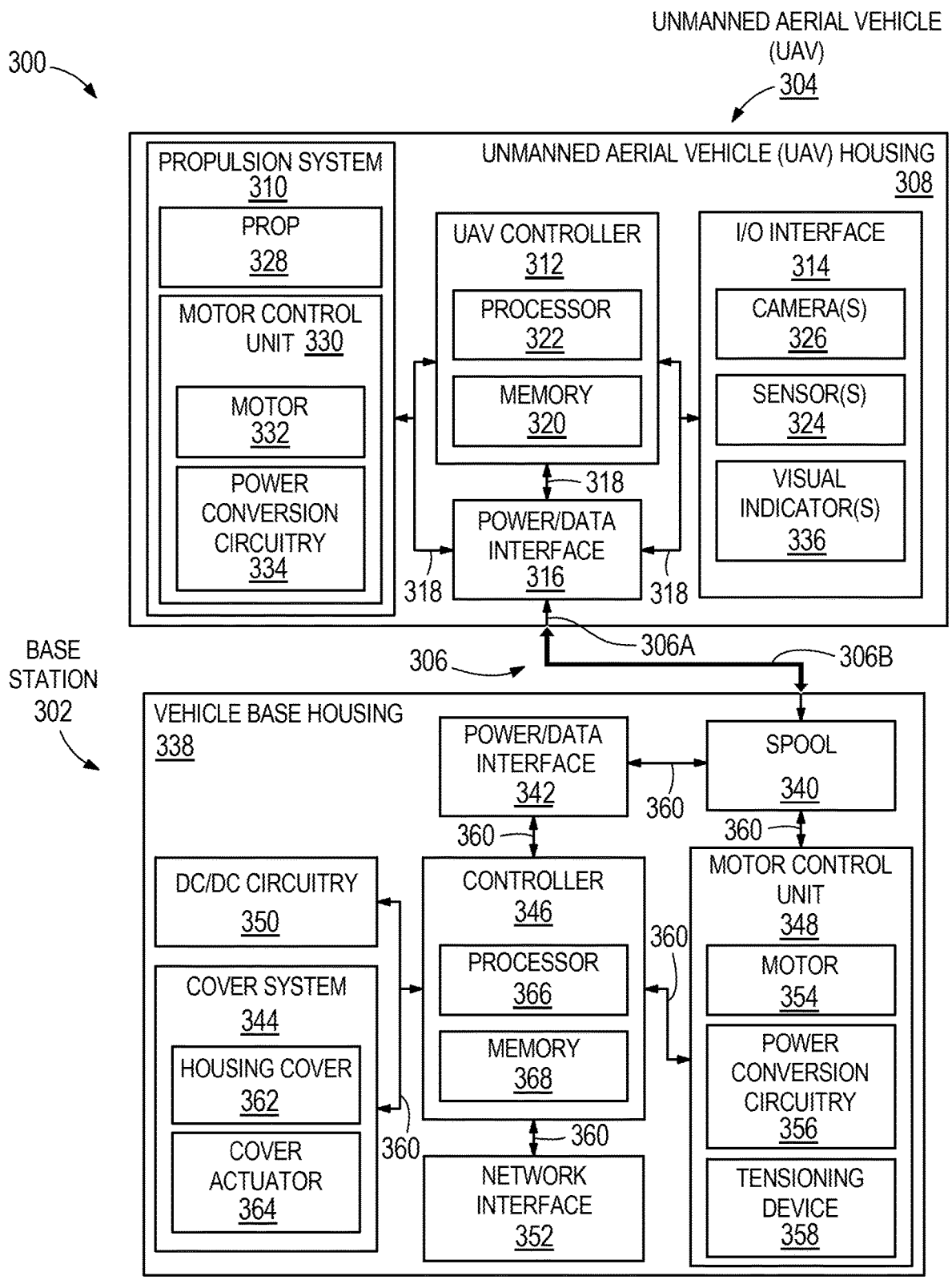
FIG. 3 is a block diagram of an unmanned aerial system, according to some embodiments.

FIG. 3 illustrates a specific embodiment of an unmanned aerial system 300, also referred to as a surveillance system. The unmanned aerial system 300 includes a base station or surveillance platform 302, a remote sensor platform or UAV 304, and a tether 306 between the UAV 304 and the base station 302. The UAV 304 includes UAV housing 308, such as a lightweight aluminum, fiberglass, polymer, or carbon-fiber shell. The UAV 304 further includes a propulsion system 310, a UAV controller 312, an Input/Output ("I/O") interface 314, and a power/data interface 316 coupled to the UAV housing 308. The propulsion system 310, UAV controller 312, and I/O interface 314 are electronically coupled to the power/data interface 316 via electronic links 318. Additionally, the UAV controller 312 is electronically coupled to the propulsion system 310 and the I/O interface 314 via electronic links 318. Accordingly, power and/or data may be supplied directly to one or more of the propulsion system 310, the I/O interface 314, and the UAV controller 312 directly from the power/data interface 316, or may be mediated by the UAV controller 312. For example, Power-over-Ethernet ("POE") may be received at the power/data interface 316 and supplied to the UAV controller 312. In some embodiments, the UAV controller 312, which include one or more electronic memories 320, and one or more processors or embedded circuitry 322, and the like, receives the POE, separates the supplied power and the communicated data, adapts the supplied power based on a required voltage or current of the propulsion system 310 and the I/O interface 314, and provides the power and data to the propulsion system 310 and the I/O interface 314.

In some embodiments, the UAV controller 312 receives sensor data from one or more sensors 324 or cameras 326 of the I/O interface 314 and communicates the sensor data to the power/data interface 316. In other embodiments, the I/O interface 314 communicates sensor data from one or more sensors 324 or cameras 326 to the power/data interface 316 directly. In other embodiments, sensor data from a first plurality of sensors 324 and cameras 326 may be transmitted from the I/O interface 314 to the UAV controller 312 and sensor data from a second plurality of sensors 324 and cameras 326 is transmitted from the I/O interface 314 to the power/data interface 316. For example, in the case that the I/O interface 314 includes an accelerometer and one or more cameras, the accelerometer data may be communicated to the UAV controller 312, while the image data from the one or more cameras is communicated to the power/data interface 316. By way of further example, image data may be communicated to both the UAV controller 312 and the power/data interface 316. Accordingly, computational requirements of the system may be distributed or scaled between the processor or embedded circuitry 322 of the UAV controller 312 and other controllers of the system as desired.

In some embodiments, the I/O interface 314 includes a plurality of cameras 326 disposed circumferentially about a bottom side of the UAV housing 308. In some embodiments, the I/O interface 314 includes cameras 326 variously configured for different ambient light conditions, distances, resolutions, framerates, fields of view, etc. In some embodiments, the I/O interface 314 further includes at least one sensor 324 configured for detecting a relative orientation between the UAV and the base station 302. In some embodiments, the relative orientation may be sensed with one or more magnetometers, accelerometers, GPS sensors, and the like. In other embodiments, the relative orientation may be sensed with the one or more cameras 326. For example, various image and video analysis techniques may be applied to image data from a plurality of cameras 326 to sense or determine a relative orientation between the UAV 304 and the base station 302. Further, in some embodiments, one or more of the cameras 326 may be controlled based on the relative orientation of the UAV 304 or between the UAV 304 and the base station 302.

Further, in some embodiments, at least one camera 326 is controlled to track an object or person. Similarly, the UAV 304 may be controlled to track an object or person. Accordingly, evidence collection, storage, and transmission may be improved.

In some embodiments, the I/O interface 314 includes one or more visual indicators 336. In some embodiments, the visual indicators 336 may be visible, infrared, or ultraviolet LEDs. In some embodiments, the visual indicators 336 are configured to receive control signals from the UAV controller 312, the power/data interface 316, or a combination thereof. The visual indicators 336 are configured for indicating one or more state of the UAV, the base station, the vehicle, or a combination thereof. In some embodiments, the visual indicators 336 are further configured to provide illumination, such as an area around the vehicle and base station, or an object in view of one of the cameras 326.

In some embodiments, the I/O interface 314 includes one or more of an ultrasonic sensor, a temperature sensor, an airspeed sensor, a barometric sensor, and an orientation sensor 324. In further embodiments, the propulsion system 310 is controlled based, at least in part, on data signals received from the I/O interface 314. For example, the UAV 304 may be transitioned between an aerial configuration to a docked configuration in response to unfavorable environmental conditions being detected with the one or more sensors 324.

The propulsion system 310 includes at least one prop 328 and a motor control unit ("MCU") 330. The MCU 330 includes at least one motor 332 and associated power conversion circuitry 334, for example, to transform, invert, or rectify received power. The MCU 330 receives power and control signals from the power/data interface 316, the UAV controller 312, or a combination thereof. The MCU 330 receives power and control signals at the power conversion circuitry 334 and provides power to the motor 332 to control thrust vectoring of prop 328. Accordingly, the propulsion system 310 is thus configured to provide sustained or indefinite flight for the UAV 304, for example, static or dynamic flight as desired. In some embodiments, the propulsion system 310 is controlled based on a relative orientation between the UAV 304 and the base station 302. For example, the propulsion system 310 may be controlled to maintain a static position of the UAV 304 relative to the base station 302 or follow one or more paths relative to the base station 302.

In addition to the electronic links 318, the power/data interface 316 is also communicably coupled to the base station 302 via the tether 306. In the illustrated embodiment, the tether 306 includes a wired connection 306A configured to transmit POE between the base station 302 and the UAV 304. In some embodiments, the tether 306 may include discrete wired power and data connections 306A. In some embodiments, the tether 306 includes a protective sheath 306B. In some embodiments, the tether 306 is sheathed with a thermoplastic sheath, such as polyvinyl chloride (PVC). Alternatively, or in addition, the protective sheath 306B flexibly and mechanically couples the UAV housing 308 to a vehicle base housing 338, such as between a pair of respective coupling mechanisms on the UAV housing 308 and the vehicle base housing 338. Accordingly, various stresses on the tether 306 are distributed by the protective sheath 306B, rather than being passed on to the wired connection 306A. In some embodiments, the tether 306 is axially aligned with a center of mass of the UAV 304. For example, in the case that the UAV 304 is symmetric under rotation, the tether 306 may be configured for attachment to the bottom of the UAV 304 along a central axis. Accordingly, torques produced by the props 328 about the attachment point of the tether 306 may be reduced. In some embodiments, the tether 306 is connected directly to vehicle base housing 338. In other embodiments, the tether 306 is coupled to a spool 340, which is coupled to the vehicle base housing 338.

The vehicle base housing 338 is configured for mounting to a vehicle (e.g. vehicle 120 of FIG. 1), and is made of a resilient material, such as an aluminum, fiberglass, polymer, or carbon-fiber shell. The vehicle base housing 338 further includes a power/data interface 342, an MCU 348 coupled to the spool 340, a cover system 344, and a base station controller 346 coupled to the power/data interface 342 and the MCU 348. The base station controller 346 is further coupled to DC/DC circuitry 350, a network interface 352, and the cover system 344. The power/data interface 342 is substantially similar to the power/data interface 316 of the UAV 304, and is coupled to the wired connection 306A of the tether 306. In the illustrated embodiment, the power/data interface 342 is coupled to the wired connection 306A at the spool 340. Accordingly, power and data (e.g. POE) may be communicated between the power/data interface 342 of the base station 302 to the power/data interface 316 of the UAV 304 via the tether 306. The spool 340 is further coupled to the MCU 348 and thereby configured for adjustment of the tether 306.

The MCU 348 includes a motor 354, associated power conversion circuitry 356, and a tensioning device 358, such as an electronic brake. Alternatively, the motor 354 may be configured as a tensioning device 358. Accordingly, the MCU 348 controls the motor 354 to extend or retract the tether 306 as desired. For example, the MCU 348 may control the height of the UAV 304 in an aerial configuration. Additionally, the MCU 348 is configured to control the motor 354 and the tensioning device 358 to apply a force to the protective sheaths of the tether 306. For example, the MCU 348 and spool 340 may be configured for electronic braking in high winds, or to reel in a damaged UAV 304. Accordingly, deployment, flight, and recovery of the UAV 304 are improved. Although a spool, motor, and electronic braking have been described and illustrated, any suitable tensioning or tether adjustment mechanisms may be used as desired.

The base station controller 346 is coupled to the various components of the base station 302 via electronic links 360. The controller receives electrical power from the DC/DC circuitry 350. In the illustrated embodiment, the DC/DC circuitry 350 is coupled to an electrical system of the vehicle to which the base station 302 is mounted, as well as to adapt power received from the vehicle based on the voltage/current requirements of one or more components of the base station 302 and/or the UAV 304. In some embodiments, the DC/DC circuitry 350 further includes one or more energy storage devices, such as lithium-ion batteries.

The cover system 344 receives power from the DC/DC circuitry 350 and is configured to open and close a cover 362 of the housing, such as a lid or segmented door. The cover system 344 includes a cover actuator 364, which is configured for opening and/or closing the housing cover 362. When the UAV 304 is docked with the base station 302, the housing cover 362 is configured to enclose the base station 302, the tether 306, and the UAV 304. When the UAV 304 is in an aerial configuration, the housing cover 362 is configured to minimize interference with movement of the UAV 304 or tether 306. In some embodiments, the cover actuator 364 includes one or more motors, elastic members, latches, or other devices configured for opening the cover, closing the cover, or maintaining the cover in an open or closed position. Actuation of the cover system 344 is controlled by the base station controller 346. Accordingly, the UAV 304 is securely retained within the vehicle base housing 338; such as while the vehicle is in motion.

The base station controller 346 includes at least one electronic processor 366 and at least one electronic memory 368, configured for storing program instructions executable by the processors 366 to execute functionality described herein. The base station controller 346 is further coupled to the network interface 352. The network interface 352 is configured for wired and wireless electronic communication. For example, the network interface 352 may include one or more antennas and may be configured to communicate over one or more wireless networks using protocols such as Wi-Fi, Bluetooth, WLAN, CDMA, etc. In some embodiments, the network interface 352 is communicatively coupled with an external data source. For example, the network interface 352 may be coupled with a mobile data terminal ("MDT") in the vehicle over a wired connection, or may be coupled to a remote server over a mobile broadband network. In some embodiments, the network interface 352 connects to server via virtual private network ("VPN") client that complies with one or more cryptographic standards related to maintaining continuity of evidence. For example, the VPN client may comply with Federal Information Processing Standard ("FIPS") Publication-2, (FIPS PUB-2). Accordingly, the base station controller 346 may securely communicate with both the UAV 304 and external data sources with the tether 306 and the network interface 352, respectively.

The base station controller 346 is configured to control the UAV 304, for example, in conjunction with the UAV controller 312, or independently. For example, the base station controller 346 may be configured to control one of the propulsion system 310 and the I/O interface 314 while the UAV controller 312 controls the other of the propulsion system 310 and the I/O interface 314. The base station controller 346 is configured to receive sensor data from the I/O interface 314. In some embodiments, the base station controller 346 is configured to transmit sensor data to an external data source in real-time. For example, the base station controller 345 may be communicatively coupled with a dedicated channel for first responders, such as the First Responder Network Authority, FirstNet, and transmit sensor data to FirstNet in real-time. In some embodiments, the base station controller 346 is configured to store sensor data in one or more electronic memories 368 of the base station controller 346 and/or electronic memories 320 of the UAV. In further embodiments, the base station controller 346 is configured to transmit a first portion of sensor data in real-time while simultaneously storing a second portion in the one more electronic memories 368. Accordingly, the base station controller 346 may be configured for record redundancy (e.g. when the first portion and the second portion comprise substantially similar sensor data) or reduced bandwidth requirements (e.g. when the first portion of sensor data is smaller than the second portion of sensor data).

In some embodiments, the base station controller 346 is configured to transmit sensor data in response to detecting a predetermined wireless signal. In some embodiments, the predetermined wireless signal may be detected from a portable electronic device or from a secure synchronization point, such as a wireless network of a police station or fire station. Accordingly, the predetermined wireless signal may be detected by the network interface 352. Subsequently, the base station controller 346 transmits sensor data, for example, to a remote evidence repository or other external data source, for secure storage.

The base station controller 346 is further configured to receive data from an external data source. In some embodiments, the base station controller 346 is configured to control the UAV 304 based, at least in part, on data from an external data source. For example, the base station controller 346 may transition the UAV 304 from a docked configuration to an aerial configuration in response to receiving an event notification signal, such as an operating state of the vehicle or a request from a portable electronic device associated with a user of the vehicle. The operating state may include any various operating states of the vehicle, such as an operating state of the drivetrain (e.g. Park, Neutral, Drive, etc.), an operating state of the electrical system (e.g. Off, Accessory, or Drive), or any other operating state of the vehicle. For example, the base station controller 346 may be configured to transition the UAV 304 between a docked configuration and an aerial configuration in response to the vehicle operating state being changed from "Drive" to "Park." By way of additional example, the base station controller 346 may be configured to transition the UAV 304 between an aerial configuration in response to the vehicle operating state being changed from "Accessory" to "Off." For example, a user of the vehicle may request that the UAV 304 be transitioned between a docked position and an aerial position, such as with a portable electronic device. Alternatively, or in addition, data from an external data source may be used to control a flight pattern or relative orientation of the UAV 304. In some embodiments, the base station controller 346 is configured to control the UAV 304 based, at least in part, on sensor data received from the I/O interface 314. For example, the base station controller 346 may transition the UAV 304 from an aerial configuration to a docked configuration based on data indicative of unfavorable environmental conditions from one or more sensors of the I/O interface 314.

Figure 4:
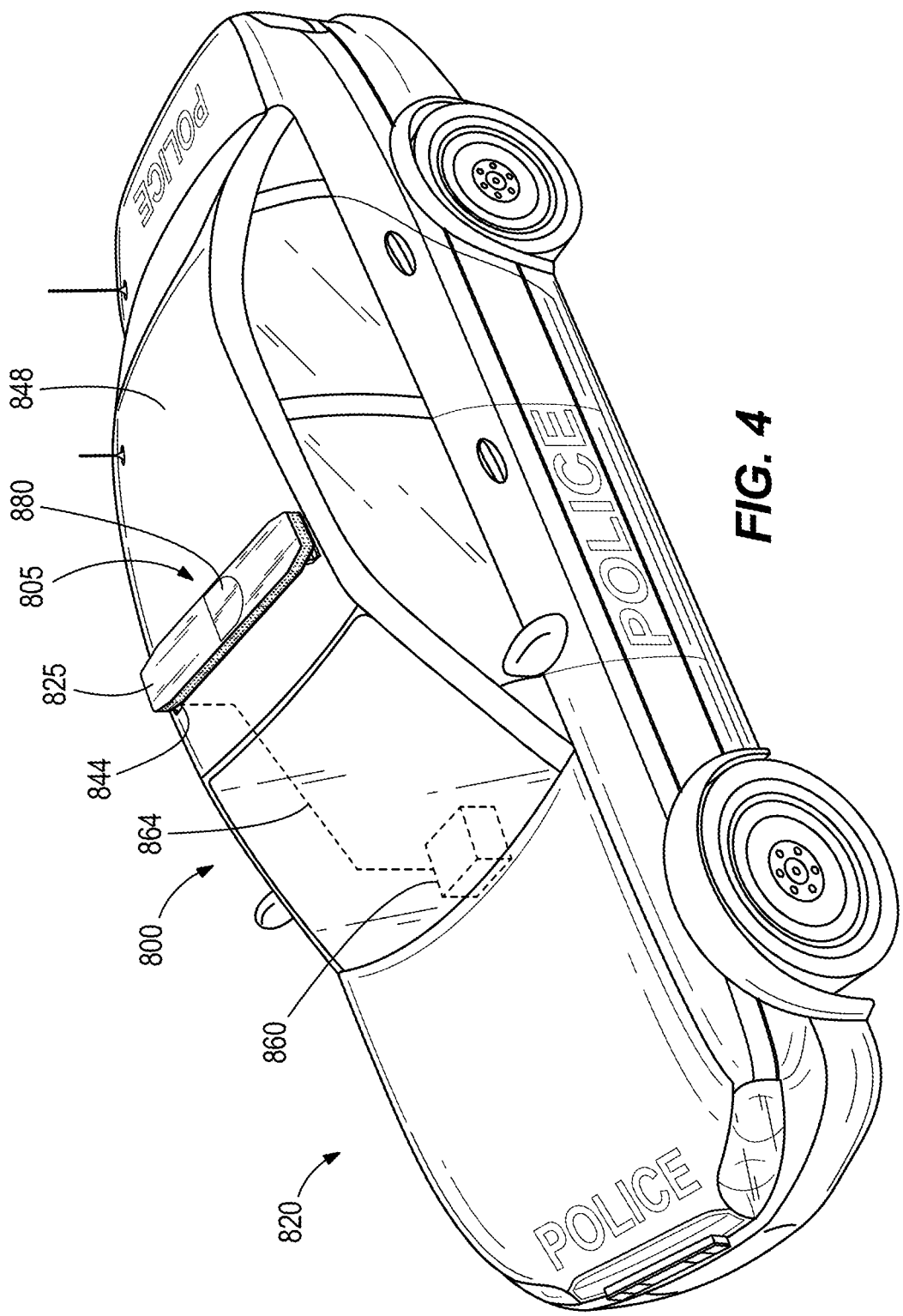
FIG. 4 is a perspective view of an unmanned aerial system according to a first embodiment and in a first state.

FIG. 4 illustrates an aerial system 800, according to another embodiment. The aerial system 800 includes a base station 805, an unmanned aerial vehicle ("UAV") 810 (see FIG. 5), and a tether 815 (see FIG. 5) extending between the base station 805 and the UAV 810. The base station 805 is mounted on an anchor vehicle 820. All attributes and features described and illustrated herein with respect to aerial systems 100, 200, and 300 are or may be implemented with aerial system 800, and are hereby supplemented.

Figure 6:
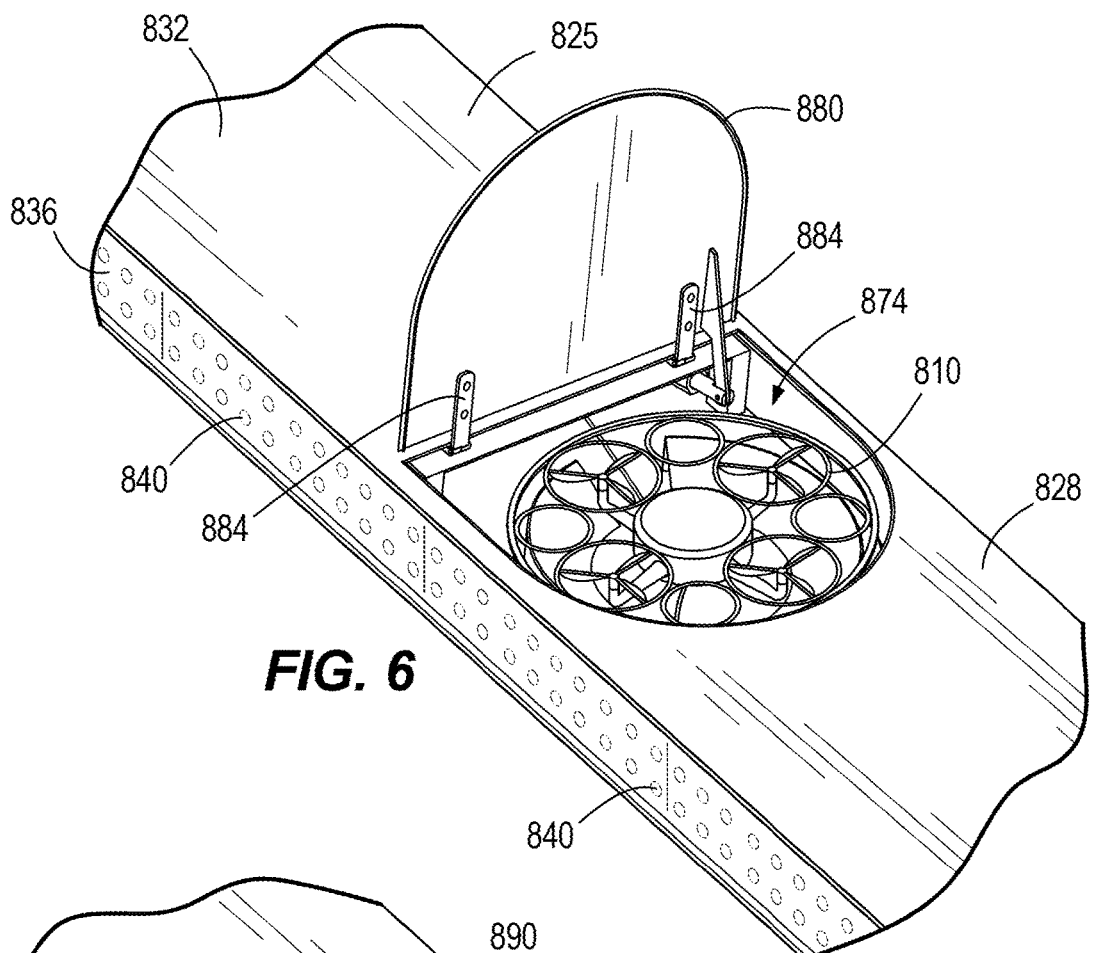
FIG. 6 is a close-up perspective view of a portion of the unmanned aerial system of FIG. 4.
Figure 7:
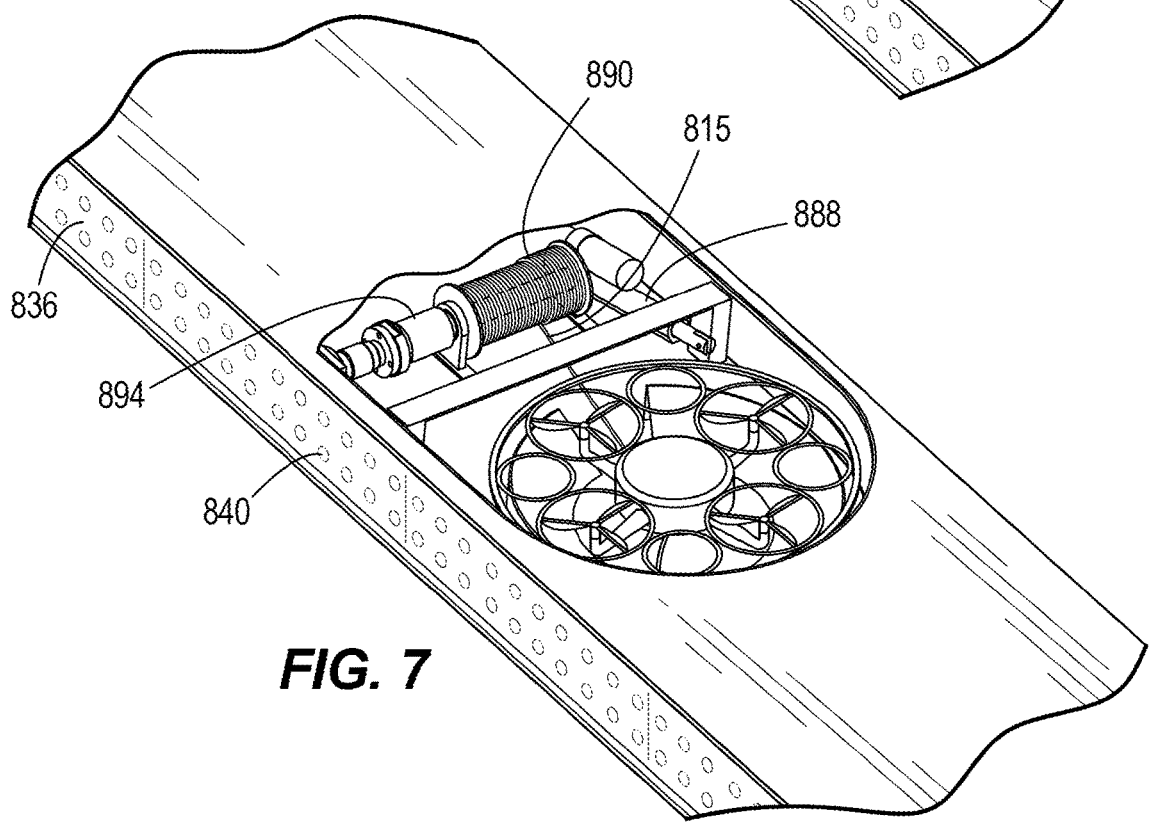
FIG. 7 is a cut-away close-up perspective view of the portion of the unmanned aerial system of FIG. 4.

In the first embodiment, the base station 805 is integrated into a light bar 825. Referring also to FIGS. 6 and 7, the light bar 825 includes a light bar body 828 having a top or upper surface 832 and a periphery 836 through which a plurality of light sources 840 are configured to provide illumination in a known manner. The light bar body 828 is supported via one or more supports 844 to the roof 848 of the vehicle 820, which may be, for example, vehicle 120 or variations thereof as herein described, and in some embodiments may be commercial vehicles. The light bar 825 is electrically coupled with an anchor vehicle controller 860 via one or more electronic links 864 and is configured to receive electrical power and data from the anchor vehicle controller 860.

In some embodiments, the UAV 810 may include one or more lights, which may be in the form of single LED light sources, or a plurality of LEDs in the form of light bars (not shown), affixed to the UAV 810. The lights may be independently operable or configured for concurrent operation with the light bar 825, and in some embodiments may mimic the illumination of the light bar 825, e.g., by synchronizing light color and timing with the light bar 825. In yet other embodiments, the UAV 810 may include lights (not shown), e.g., floodlights, which can be oriented to illuminate a specific location over which the UAV 810 travels. Such lights may be controllable for cooperation with cameras located on the UAV 810, though in other embodiments a UAV 810 with lights may have no cameras. In still other embodiments, the UAV 810 may include other types of emergency or signaling lights, e.g. traffic light functions, in some instances by a controller interface with a local traffic control network or in coordination with other UAVs having a similar purpose. Further embodiments may include modular lights such that a UAV 810 may be outfitted in the field with a light array or arrays suitable for the situation encountered by the operator prior to deployment of the UAV 810.

Figure 5:
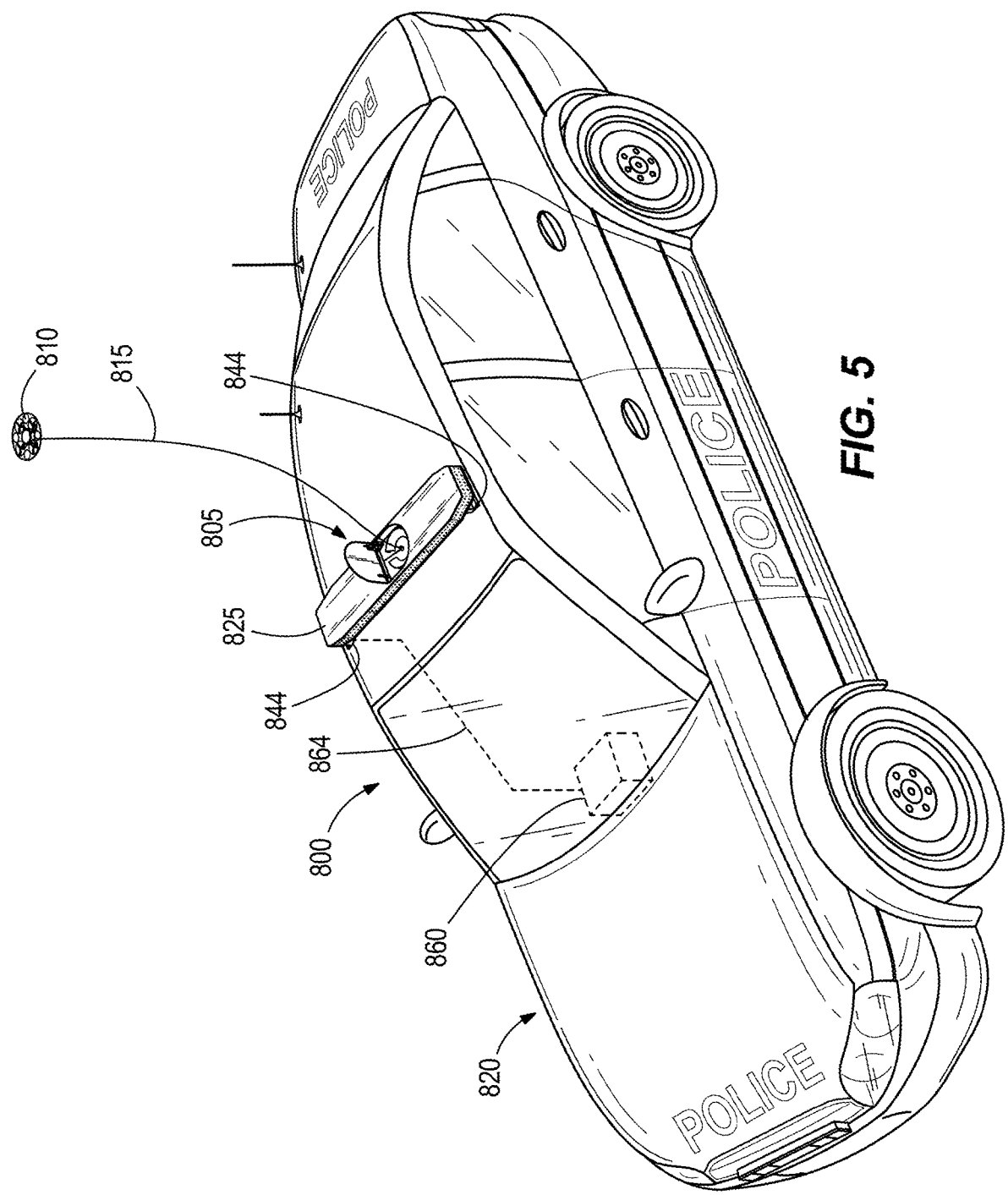
FIG. 5 is a perspective view of the unmanned aerial system of FIG. 4 in a second state.

FIG. 5 illustrates the aerial system 800 with the UAV 810 in an aerial configuration. The tether 815 extends between the base station 805 and the UAV 810, and secures the UAV 810 to the base station 805, as well as communicates power from the base station 805 to the UAV 810, such as for a propulsion system of the UAV 810. The tether 815 is further configured to transmit data signals between the base station 805 and the UAV 810, all as described herein. Accordingly, deployment, flight, and recovery of the UAV 810 may be controlled by the base station 805 in the manner previously described.

When not in flight, the UAV 810 is docked and concealed within the base station 805. Referring again to FIGS. 6 and 7, the base station 805 is fully integrated into the light bar 825 such that the profile of the light bar 825 remains when the UAV 810 is secured therein, resulting in no noticeable change in aesthetics, air resistance, or other characteristics (i.e., no change in footprint or profile).

The base station 805 includes a cavity 874, which may or may not be partitioned, and an operational lid, hatch, or cover 880. The cover 880 is sized and shaped to permit ingress and egress of the UAV 810. The cover 880 is passively secured to the base station 805 by a pair of hinges 884 at one end and actively secured to the base station 805 and movable with respect thereto by an actuator 888, which may be in the form of, for example, an electrically actuated solenoid or cylinder.

The cavity 874 extends within the body 828 and is not limited by the shape or size of the cover 880. With reference to FIG. 7, a cutaway view of the base station 805 illustrates a docked UAV 810 (positioned on a pad, not shown) and a tether extension and retraction mechanism, which may be in the form of a reel, winder, or spool 890. The tether 815 is wound around the spool 890, which is operatively coupled to a motor 894. The tether 815 is routed from the spool 890 to the pad and to the UAV 810, to be further described and shown with respect to a following embodiment.

Figure 8:
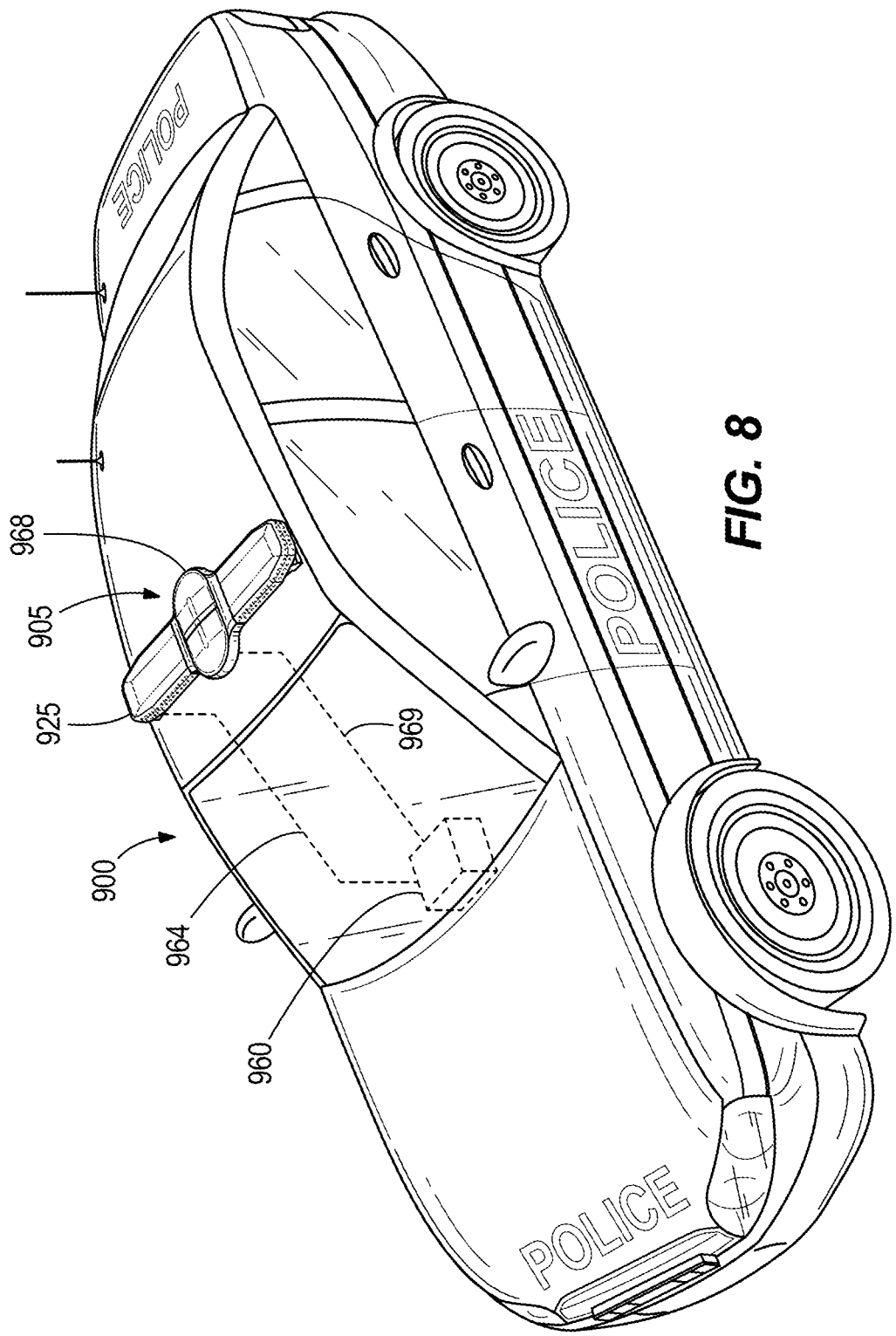
FIG. 8 is a perspective view of an unmanned aerial system according to another embodiment and in a first state.
Figure 9:
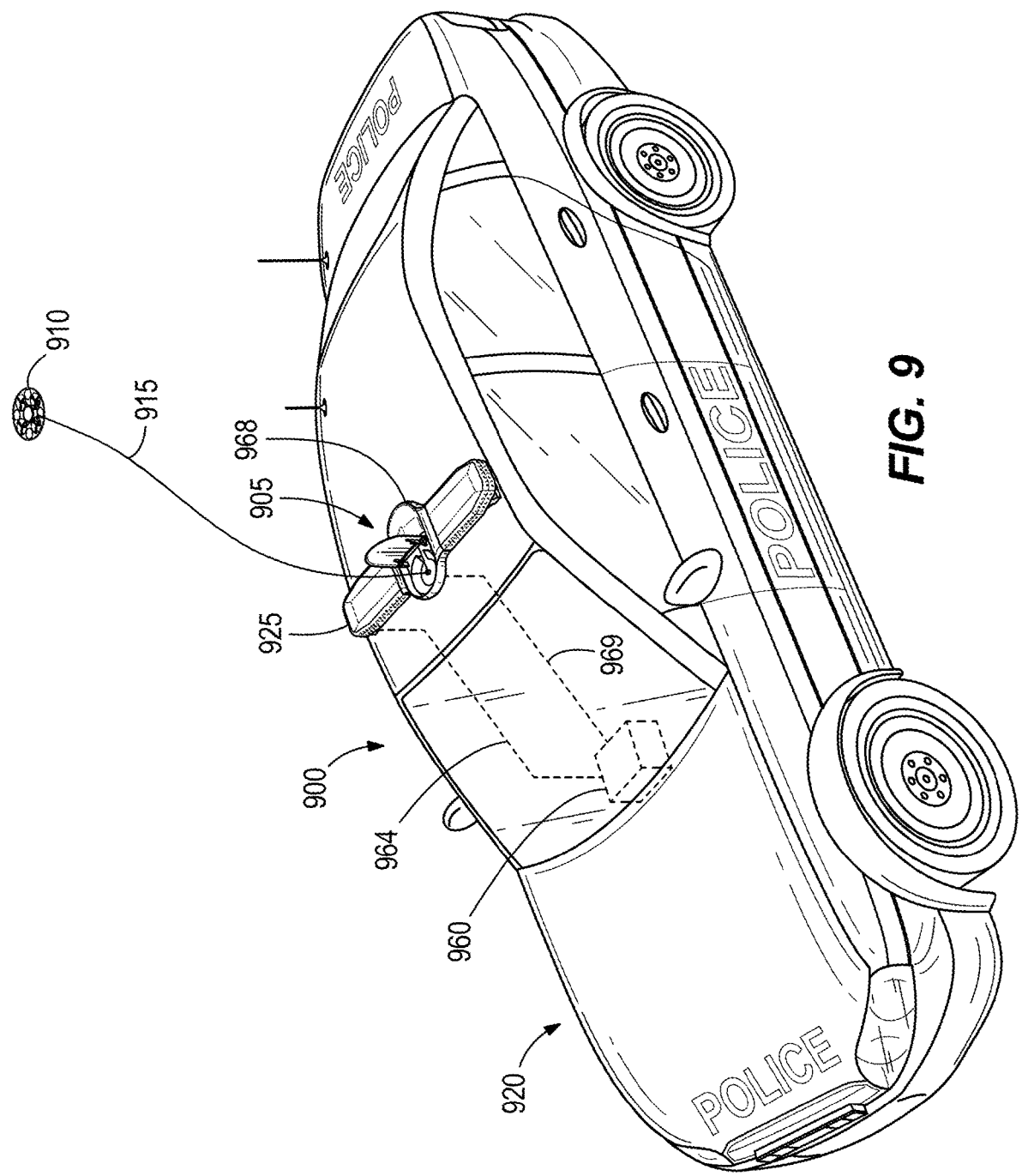
FIG. 9 is a perspective view of the unmanned aerial system of FIG. 8 in a second state.

FIG. 8 illustrates an aerial system 900, according to a first embodiment. The aerial system 900 includes a base station 905, an unmanned aerial vehicle ("UAV") 910 (see FIG. 9), and a tether 915 (see FIG. 9) extending between the base station 905 and the UAV 910. The base station 905 is mounted on an anchor vehicle 920. All attributes and features described and illustrated herein with respect to aerial systems 100, 200, 300, and 800 are or may be implemented with aerial system 900, and are hereby supplemented.

Figure 10:
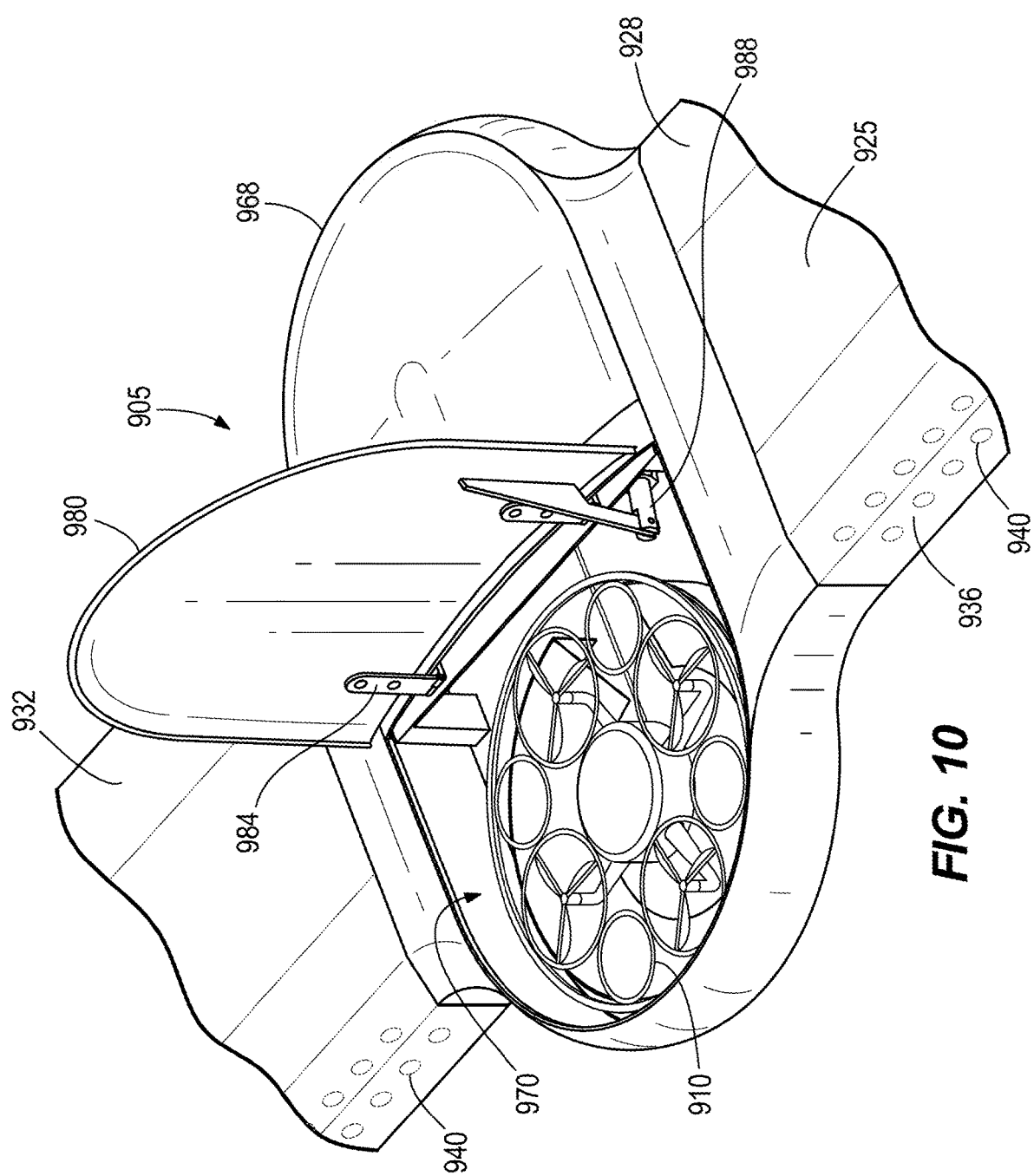
FIG. 10 is a close-up perspective view of a portion of the unmanned aerial system of FIG. 8.

In this embodiment, rather than integrated into or within a light bar 925, the base station 905 is formed into, formed with, or formed as part of a light bar 925. Referring also to FIG. 10, the light bar includes a light bar body 928 having a top or upper surface 932 and a periphery 936 from which a plurality of light sources 940 are configured to provide illumination in a known manner. The light bar 925 is electrically coupled with an anchor vehicle controller 960 via one or more electronic links 964.

A housing portion 968 is generally centrally positioned with respect to the light bar 925. The housing portion 968 may be formed with the light bar 925, in which case it may be considered as integrally formed as one piece with the light bar 925. Alternatively, the light bar 925 may be formed with a recess or receptacle to receive the housing portion 968 for attachment thereto. The shape of the housing portion 968 illustrates is not limiting, and other shapes are contemplated herein. In either embodiment, links 964 or a separate electronic link 969 may provide and/or receive electrical power and data from the housing portion 968. Accordingly, deployment, flight, and recovery of the UAV 910 may be controlled by the base station 905 in the manner previously described.

The housing portion 968 includes a cavity 970, which may or may not be partitioned, and an operational cover 980. The cover 980 is sized and shaped to permit ingress and egress of the UAV 910. The cover 980 is passively secured to the base station housing portion 968 by a pair of hinges 984 at one end and actively secured to the housing portion 968 and movable with respect thereto by an actuator 988, which may be in the form of, for example, an electrically actuated solenoid or cylinder.

Figure 11:
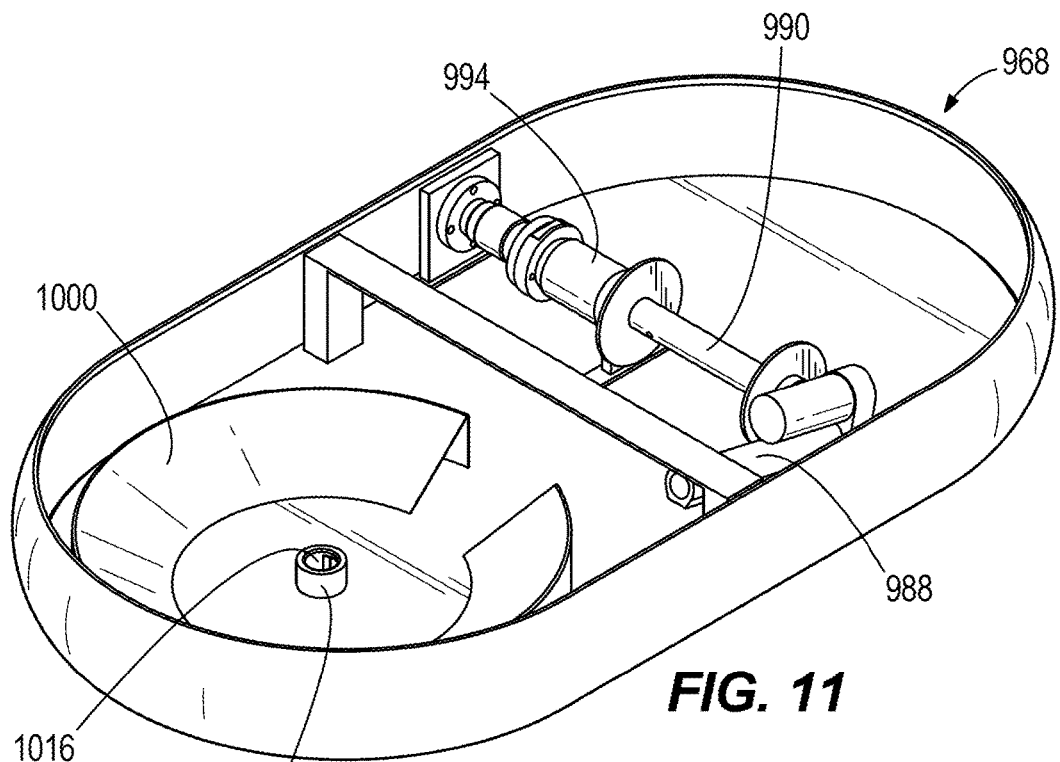
FIG. 11 is a perspective view of a housing portion of the unmanned aerial system of FIG. 8.
Figure 12:
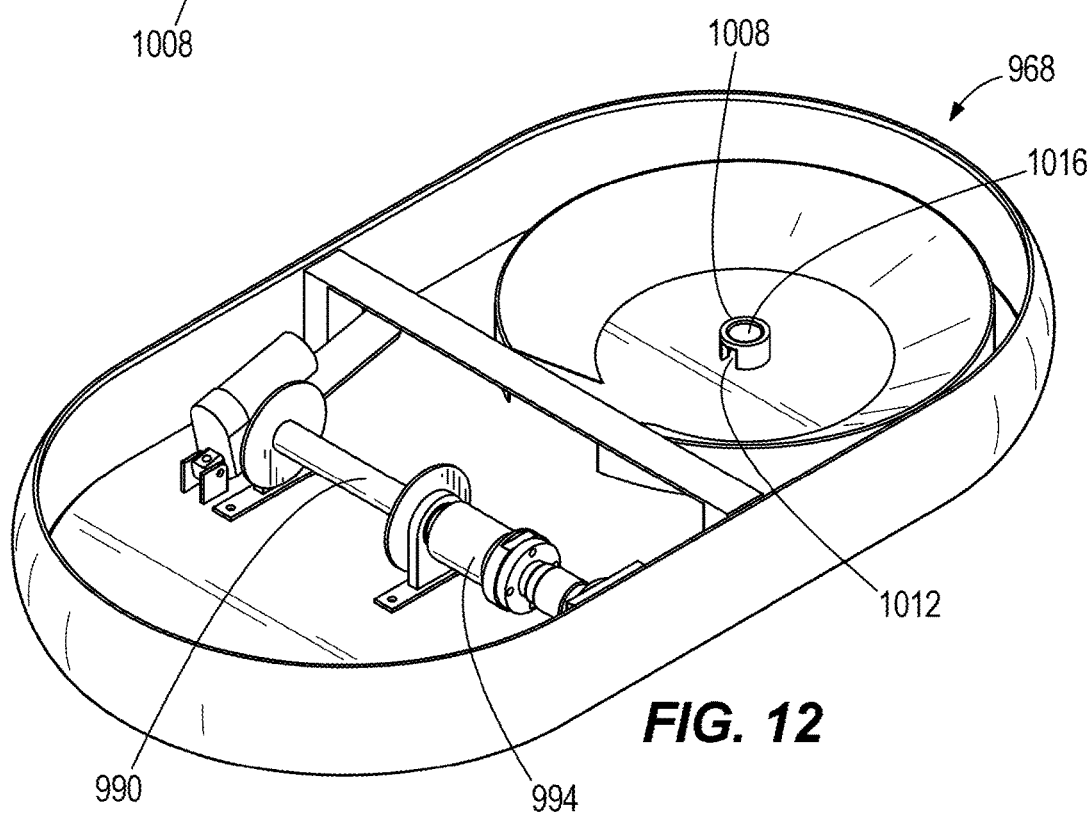
FIG. 12 is another perspective view of the housing portion of the unmanned aerial system of FIG. 8.
Figure 13:
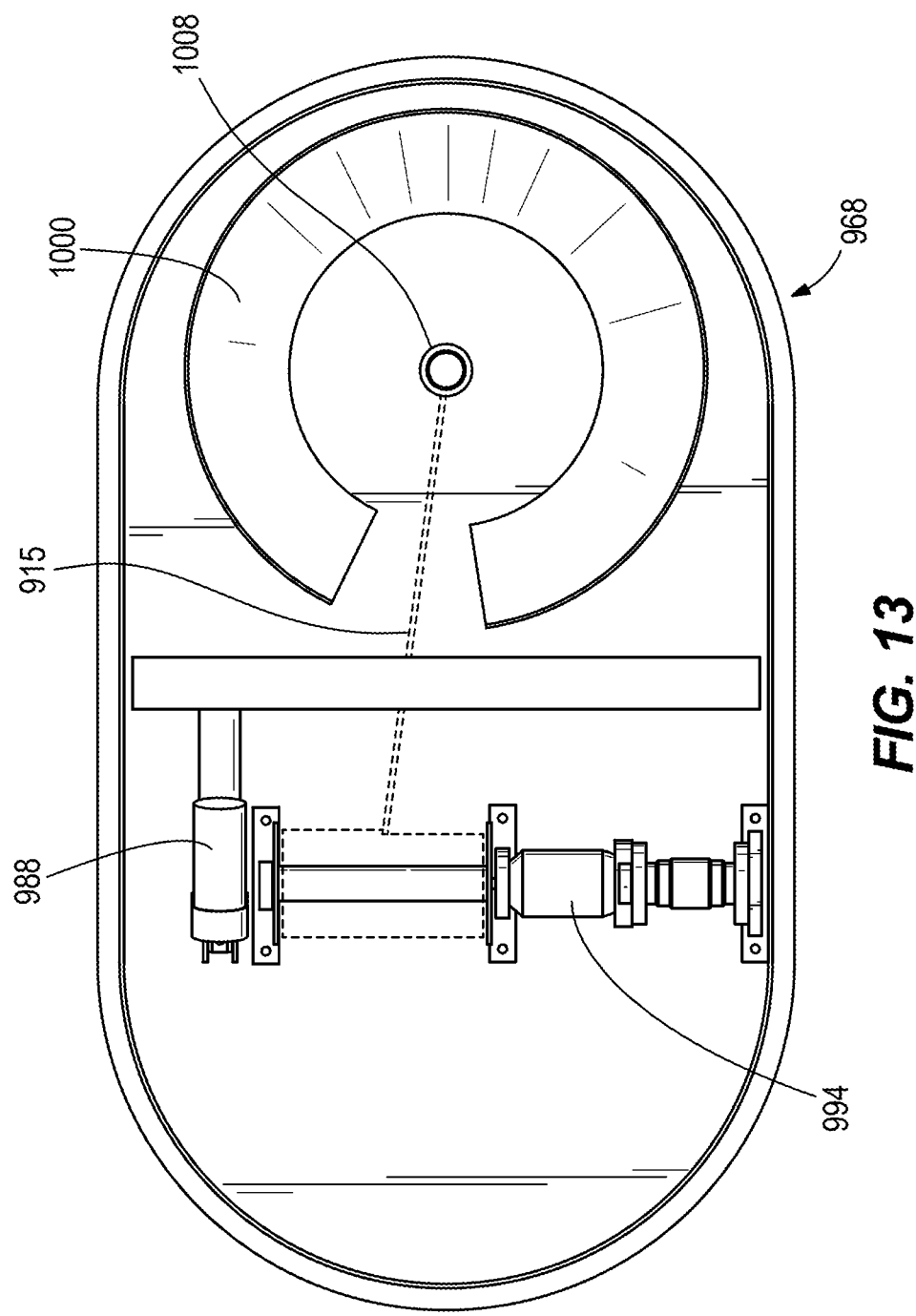
FIG. 13 is a top view of the housing portion of the unmanned aerial system of FIG. 8.

Referring to FIGS. 11 and 12, the housing portion 968 includes a spool 990 operatively coupled to a motor 994 and a base or pad 1000, all positioned within the cavity 970. The pad 1000 is formed to receive and support the UAV 910 thereon and has a guide 1008 generally concentric with the contour of the pad 1000. The guide 1008 includes an opening or notch 1012 in communication with a central aperture 1016. Referring to FIG. 13, the guide 1008 is configured in relation to the spool 990 such that the tether 915 extends from the spool 990 and passes through the notch 1012 and out of the central aperture 1016 for coupling with the UAV 910.

Figure 14:
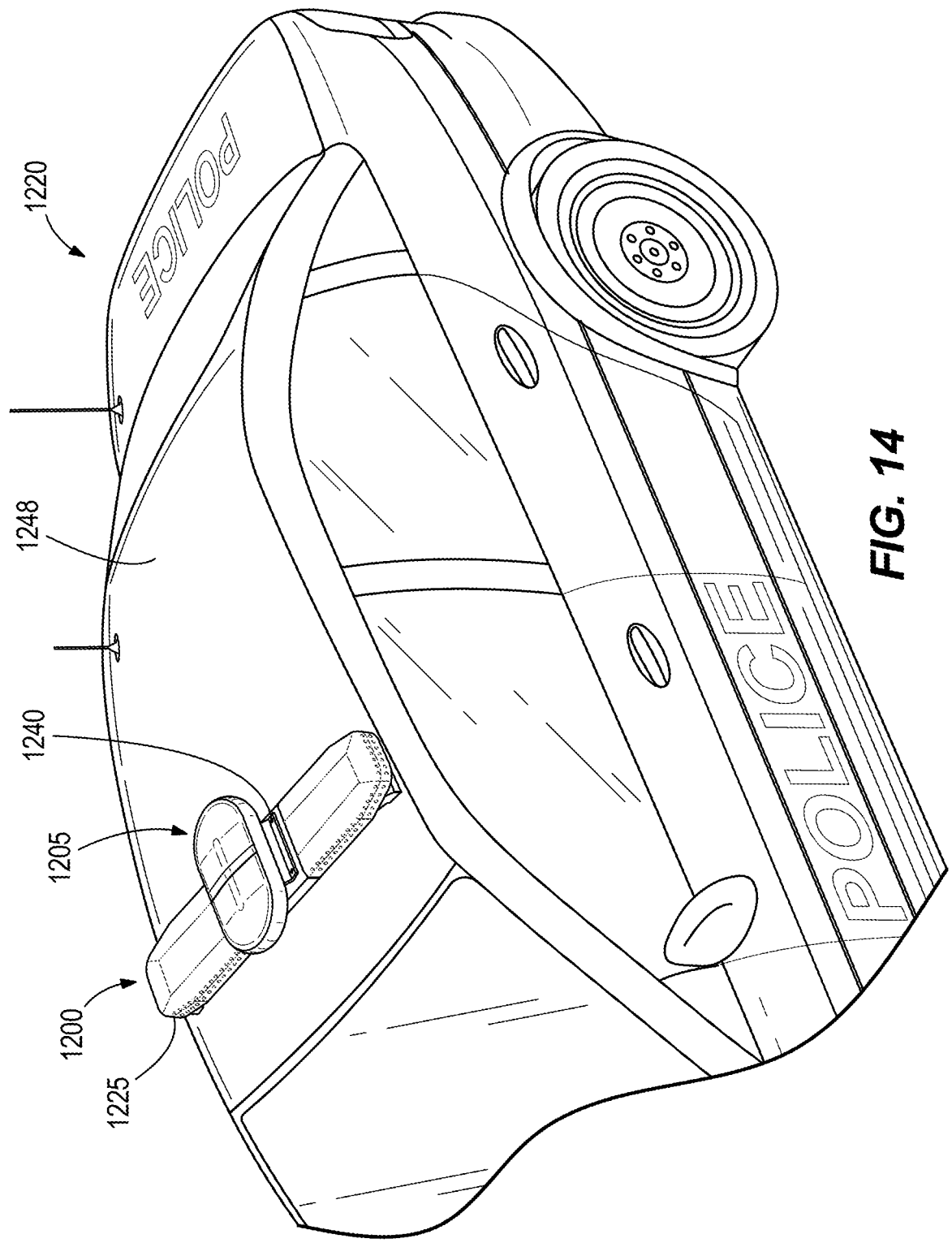
FIG. 14 is a perspective view of an unmanned aerial system according to another embodiment and in a first state.
Figure 15:
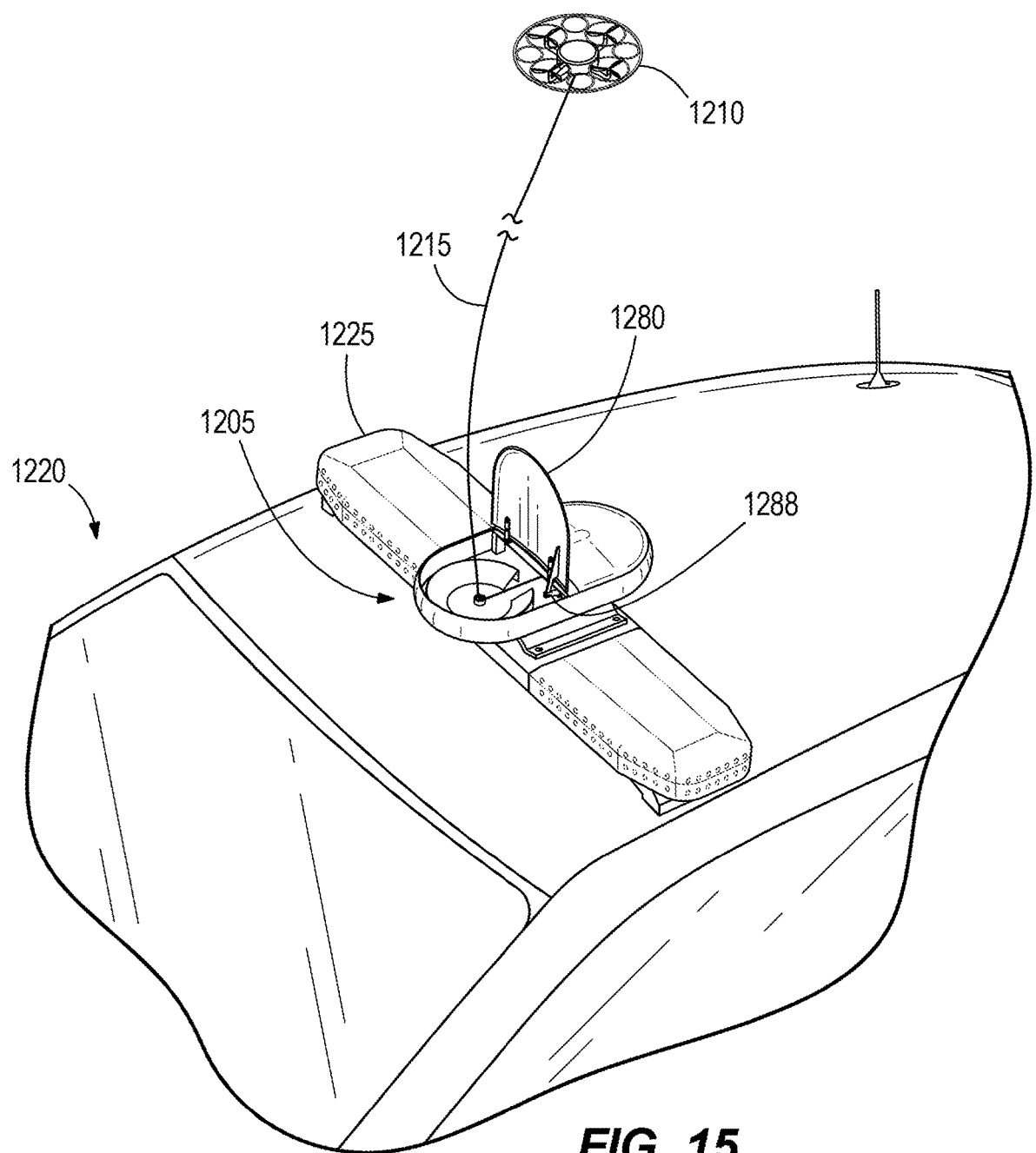
FIG. 15 is a close-up perspective view of the unmanned aerial system of FIG. 14 in a second state.

Referring to FIG. 14, an aerial system 1200 includes a base station 1205, an unmanned aerial vehicle ("UAV") 1210 (FIG. 15), and a tether 1215 (FIG. 15) extending between the base station 1205 and the UAV 1210. The base station 1205 is mounted on an anchor vehicle 1220. All attributes and features described and illustrated herein with respect to aerial systems 100, 200, 300, 800, and 900 are or may be implemented with aerial system 1200, and are hereby supplemented.

In this embodiment, rather than formed into, formed with, or formed as part of a light bar 1225, the base station 1205 is attached to the light bar 1225. The base station 1205 may be affixed to the light bar 1225 through the use of one or more brackets 1240. Alternatively, other forms of fastening may be used. The base station 1205 could be positioned at any location on the light bar 1225 or in other embodiments could be positioned on the vehicle roof 1248 and affixed thereto, whether proximate to the light bar 1225 or not. Due to any potential separation between the base station 1205 and the light bar 1225, the base station 1205 may include openings therethrough as necessary to permit connection with any of electronic links similar to links 964, 969, such that power and data connectivity may be direct from the vehicle 1220 (through a conduit or other passage in the body or adjacent body panels) or it may instead be through or as part of the connectivity from the vehicle 1220 to the light bar 1225 (for example, the base station 1205 may be electrically coupled (i.e., "daisy chain") to the anchor vehicle controller (e.g., controller 960) via the existing power and/or data connections to the light bar 1225). In yet other embodiments, the base station 1205 may include a separate power source and electronics as described herein. As a result, the base station 1205 may be installed as a retrofit for existing emergency vehicles.

The base station 1205 is in other respects similar to the housing portion 968 of FIGS. 10-13. Accordingly, deployment, flight, and recovery of the UAV 1210 may be controlled by the base station 1205.

In operation, the vehicle operator may choose to deploy the UAV from within the anchor vehicle 820. Upon initiation by the operator (e.g., via a pushbutton accessible from a vehicle driver location), through controllers 860, 960, the actuator 888, 988, 1288 engages to automatically move the cover 880, 980, 1280 from a closed to an open position. Once opened, the UAV 810, 910, 1210 is available for operations and controllable as herein described. Once operations are complete and the spool (990) retracts the UAV 810, 910, 1210 to a position within the base station 805, 905, 1205, the actuator 888, 988, 1288 again engages to move the cover 880, 980, 1280 from the open position to a closed position, effectively protecting the UAV 810, 910, 1210 from the external environment. Control of the aforementioned operations may occur entirely from within the vehicle 820, 920, 1220 or from a location remote from the vehicle 820, 920, 1220.

In some embodiments, the base station 805, 905, 1205 may include local actuation components to permit manual operation (i.e., pushbutton or other adjustable control knobs, switches, etc.) directly at the light bar 825, 925, 1225 itself. In some embodiments, the base station 805, 905, 1205 may itself include one or more sensors to provide information regarding local environmental conditions that may have a detrimental effect on operation of the UAV 810, 910, 1210. For example, the base station 805, 905, 1205 may include a sensor for sensing wind velocity, such that the controller 860, 960 prevents opening of the cover 880, 980, 1280 if the local air speed is above a predetermined or threshold amount and provides a warning to the operator of such conditions.

Thus, the disclosure provides, among other things, an unmanned aerial system including a base station, a UAV, and a tether extending between the base station and the UAV. Various features and advantages of the disclosure are set forth in the following claims.

What is claimed is:

1. An unmanned aerial vehicle subsystem comprising:
   a vehicle-mountable light bar, the light bar including a periphery and a plurality of lights configured to illuminate through at least a portion of the periphery, the light bar further defining a volume within which is positioned an unmanned aerial vehicle pad and a tether extension and retraction mechanism;
   an unmanned aerial vehicle having at least one camera; and
   a tether operable with the tether extension and retraction mechanism and extendable from the tether extension and retraction mechanism to the unmanned aerial vehicle, wherein the tether is configured to, during flight of the unmanned aerial vehicle, transmit power to the unmanned aerial vehicle and transmit data signals to and from the unmanned aerial vehicle,
   wherein the unmanned aerial vehicle further includes a light configured to illuminate concurrently with at least one light of the plurality of lights of the light bar.

2. The unmanned aerial vehicle subsystem of claim 1, wherein the light bar includes a cover enclosing the volume and operable to open and close remotely from the light bar.

3. The unmanned aerial vehicle subsystem of claim 1, wherein the unmanned aerial vehicle further includes a plurality of lights configured to mimic illumination of the light bar.

4. The unmanned aerial vehicle subsystem of claim 1, wherein the unmanned aerial vehicle includes an infrared sensor.

5. The unmanned aerial vehicle subsystem of claim 1, wherein the at least one camera includes four cameras oriented to provide 360-degree viewing about the unmanned aerial vehicle.

6. A first responder vehicle comprising:
   a vehicle body, a portion of which defines a vehicle roof;
   a vehicle mounted surveillance platform including
     a base station defining a volume within which is positioned an unmanned aerial vehicle pad and a tether extension and retraction mechanism, and
     a light bar having a plurality of lights in operable communication with a controller of the vehicle; and
   an unmanned aerial vehicle configured for tethered deployment from and transportation within the base station, wherein the unmanned aerial vehicle is configured to be deployed from an operator positioned within the vehicle body, wherein the base station is integrally formed as one piece with the light bar such that the profile of the light bar remains when the unmanned aerial vehicle is secured within, and wherein the unmanned aerial vehicle includes a plurality of lights operable to synchronize with the light bar light color and timing.

7. The first responder vehicle of claim 6, wherein the base station includes a cover for enclosing the volume, the cover operable by the operator within the vehicle body.

8. The unmanned aerial vehicle subsystem of claim 1, further including
- a controller interface in communication with a traffic control network, and
- wherein the unmanned aerial vehicle further includes a plurality of lights configured to mimic a traffic light function.

\* \* \* \* \*